United States Patent
Eitel et al.

(10) Patent No.: US 8,967,221 B2
(45) Date of Patent: Mar. 3, 2015

(54) METHOD AND INSTALLATION FOR APPLYING FOIL MATERIAL ONTO SUCCESSIVE SHEETS

(75) Inventors: Johann Emil Eitel, Thüngen (DE); Matthias Gygi, Schmitten (CH); Kurt Georg Nagler, Würzburg (DE)

(73) Assignee: KBA-Notasys SA, Lausanne (CH)

( * ) Notice: Subject to any disclaimer, the term of this patent is extended or adjusted under 35 U.S.C. 154(b) by 938 days.

(21) Appl. No.: 13/000,538

(22) PCT Filed: Jun. 26, 2009

(86) PCT No.: PCT/IB2009/052763
§ 371 (c)(1),
(2), (4) Date: Jun. 6, 2011

(87) PCT Pub. No.: WO2010/001317
PCT Pub. Date: Jan. 7, 2010

(65) Prior Publication Data
US 2011/0259513 A1      Oct. 27, 2011

(30) Foreign Application Priority Data

Jul. 3, 2008   (EP) .................................... 08159651

(51) Int. Cl.
*B32B 38/00*     (2006.01)
*B32B 38/04*     (2006.01)
(Continued)

(52) U.S. Cl.
CPC ............. *B32B 38/0004* (2013.01); *B32B 37/22* (2013.01); *B42D 15/0013* (2013.01);
(Continued)

(58) Field of Classification Search
CPC ...... B32B 37/22; B32B 38/04; B44C 1/1729; B42D 15/0013
USPC .................................. 156/510, 513, 516, 522
See application file for complete search history.

(56) References Cited

U.S. PATENT DOCUMENTS 2,776,068 A    1/1957    Johnson
4,702,789 A    10/1987   Ceraso
(Continued)

FOREIGN PATENT DOCUMENTS

EP    0965446    12/1999
EP    1961578    8/2008
(Continued)

*Primary Examiner* — Philip Tucker
*Assistant Examiner* — Christopher C Caillouet
(74) *Attorney, Agent, or Firm* — Seager, Tufte & Wickhem LLC

(57) ABSTRACT

There is described a method for applying foil material (200) onto successive sheets (S), especially sheets for the production of securities, such as banknotes. In a first step, individual sheets (S) are transported in succession along a sheet transport path. In a second step, at least one continuous band of foil material (200) is applied onto the individual sheets (S) along a direction substantially parallel to a direction of displacement (A) of the individual sheets, thereby forming a continuous flow of sheets linked to one another by the said at least one continuous band of foil material (200). In a third step, the said at least one continuous band of foil material (200) is cut by means of a laser beam (L) such that the continuous flow of sheets is again separated into individual sheets (S) with portions of foil material (200*) remaining on the sheet. The cutting is performed at positions located on the sheets (S) such that said portions of foil material (200*) remaining on the sheets do not extend beyond leading and trailing edges of the sheets (S). Waste portions (205) of said at least one continuous band of foil material (200) that are not to remain on the sheets (S) are seized prior to cutting by the laser beam (L) and are held throughout the cutting process. There is also described an installation for carrying out the above method.

8 Claims, 18 Drawing Sheets

(51) Int. Cl.
  *B32B 38/10* (2006.01)
  *B32B 37/22* (2006.01)
  *B42D 15/00* (2006.01)
  *B44C 1/17* (2006.01)
  *B32B 37/00* (2006.01)

(52) U.S. Cl.
  CPC ........... *B44C1/1729* (2013.01); *B32B 37/0046* (2013.01); *B32B 2310/0843* (2013.01); *B32B 2429/00* (2013.01); *B42D 2031/28* (2013.01); *B42D 2031/30* (2013.01)
  USPC ............ 156/522; 156/510; 156/513; 156/516

(56) References Cited

U.S. PATENT DOCUMENTS

| | | | |
|---|---|---|---|
| 5,691,023 | A | 11/1997 | Keller |
| 5,937,759 | A | 8/1999 | Mitsam et al. |
| 6,062,134 | A | 5/2000 | Eitel et al. |
| 6,112,651 | A | 9/2000 | Eitel et al. |
| 6,142,069 | A | 11/2000 | Eitel et al. |
| 6,182,959 | B1 | 2/2001 | Eitel et al. |
| 6,202,549 | B1 | 3/2001 | Mitsam et al. |
| 6,263,790 | B1 | 7/2001 | Wyssmann et al. |
| 6,428,051 | B1 | 8/2002 | Herrmann et al. |
| 6,508,489 | B2 | 1/2003 | Herrmann et al. |
| 7,384,495 | B2 | 6/2008 | Schaede |
| 2002/0030360 | A1 | 3/2002 | Herrmann et al. |
| 2005/0166771 | A1 | 8/2005 | Gygi et al. |
| 2005/0241445 | A1 | 11/2005 | Schaede |
| 2006/0231537 | A1 | 10/2006 | Schaede |
| 2006/0283542 | A1 | 12/2006 | Schaede |
| 2007/0029784 | A1 | 2/2007 | Moreau |
| 2007/0222206 | A1 | 9/2007 | Schaede et al. |
| 2008/0271854 | A1 | 11/2008 | Eitel et al. |
| 2009/0173430 | A1 | 7/2009 | Schaede |
| 2010/0024511 | A1 | 2/2010 | Eitel et al. |
| 2011/0017393 | A1 | 1/2011 | Eitel et al. |

FOREIGN PATENT DOCUMENTS

| | | |
|---|---|---|
| WO | 94/13487 | 6/1994 |
| WO | 95/10420 | 4/1995 |
| WO | 97/01442 | 1/1997 |
| WO | 97/35721 | 10/1997 |
| WO | 97/35794 | 10/1997 |
| WO | 97/35795 | 10/1997 |
| WO | 97/36756 | 10/1997 |
| WO | 03/043823 | 5/2003 |
| WO | 03/092971 | 11/2003 |
| WO | 2004/024464 | 3/2004 |
| WO | 2004/096482 | 11/2004 |
| WO | 2004/096541 | 11/2004 |
| WO | 2005/068211 | 7/2005 |
| WO | 2005/102728 | 11/2005 |
| WO | 2005/102733 | 11/2005 |
| WO | 2008/104904 | 9/2008 |

METHOD AND INSTALLATION FOR APPLYING FOIL MATERIAL ONTO SUCCESSIVE SHEETS

TECHNICAL FIELD

The present invention generally relates to a method and installation for applying foil material onto successive sheets, especially sheets for the production of securities. The present invention is especially applicable in the context of the production of security documents, such as banknotes.

BACKGROUND OF THE INVENTION

The application of foil material onto sheets, especially sheets for the production of securities, is as such already well-known in the art. Such application is typically aimed at providing securities with additional security elements, such as in particular so-called OVD's (Optically Variable Devices). OVD's typically take the form of a patch or foil laminate comprising an optically-diffractive layer (usually a metallized layer) producing optically variable effects. OVD's are in particular known under the name of KINEGRAM®, which is a registered trademark of OVD Kinegram AG, a member of the Leonhard Kurz Group.

OVD's are typically supplied in the form of a continuous film or band of carrier material carrying transfer elements that are to ultimately form the actual OVD's. These are usually applied using so-called hot-foil stamping techniques, which make use of combined pressure and temperature to activate an adhesive layer provided on the transfer elements and cause transfer thereof from the carrier material onto the sheets or web being processed.

Method and installations for carrying out hot-foil stamping techniques are disclosed for instance in International applications nos. WO 94/13487 A1, WO 97/01442 A1, WO 97/35721 A1, WO 97/35794 A1, WO 97/35795 A1, WO 97/36756 A1, WO 03/043823 A1, WO 2005/102733 A2, and European patent application EP 0 965 446 A1.

Besides the application of OVD's on securities, it has also been proposed to cut windows in the securities and cover these windows with a film of foil material, usually transparent. Such a solution is for instance proposed in International application no. WO 95/10420 A1. In contrast to OVD's, the layer of foil material that is applied to cover windows is comparatively thicker and more resistant as it has to withstand greater mechanical constraints and be self-supporting in the region of the window.

Similarly, it has also been proposed to reinforce regions of reduced thickness created in securities by the provision of a film of foil material onto said regions. A method for reinforcing security documents provided with at least one zone of reduced thickness is for instance disclosed in International application no. WO 2004/024464 A1.

Provision of windows in securities can be carried out in different ways. A method and installation for cutting windows in sheets using mechanical cutting tools is for instance disclosed in International application no. WO 03/092971 A1. A method and installation for cutting windows in sheets using a laser-cutting tool is for instance disclosed in International application no. WO 2004/096482 A1.

Covering of the windows by foil material is discussed in greater detail in International applications nos. WO 2004/096541 A1 and WO 2005/068211 A1.

According to International application no. WO 2004/096541 A1, foil material is applied in the form of successive strips of foil material that are cut upstream of an application unit. The application unit is basically similar to those used for carrying out hot-foil stamping with the main difference that the strips of foil material are completely transferred onto the sheets. In this context, it is more appropriate to say that the application unit performs lamination of the foil material onto the sheets, rather than stamping, which process involves transfer of an element from a carrier band onto the sheets and recuperation of the used carrier band.

The solution of International application no. WO 2004/096541 A1 has been found to be rather difficult to implement as it requires precise cutting and positioning of the cut strips of laminate with respect to the sheets. This prior art solution in particular requires a specifically-designed aspiration system to properly seize and transport the strips of laminate such that these are brought in contact with the sheets at the desired locations.

The solution of International application no. WO 2004/096541 A1 is furthermore only applicable for strips of laminate having a minimum length and is in particular not suited for applying small-sized patches of foil material onto the sheets.

There is therefore a need for an improved method and installation for applying foil material onto successive sheets. Such an improved method and installation forms the subject-matter of European patent application No. 07103051.4 entitled "METHOD AND INSTALLATION FOR APPLYING FOIL MATERIAL ONTO SUCCESSIVE SHEETS" filed on Feb. 26, 2007 in the name of the present Applicant, as well as the subject-matter of International application No. PCT/IB2008/050626 of Feb. 21, 2008 which claims priority of EP 07103051.4, the contents of both applications being incorporated herein by reference in their entirety.

This improved method comprises the following steps. In a first step, individual sheets are transported in succession along a sheet transport path. In a second step, at least one continuous band of foil material is applied onto the individual sheets along a direction substantially parallel to a direction of displacement of the individual sheets, thereby forming a continuous flow of sheets linked to one another by the said at least one continuous band of foil material. In a third step, the said at least one continuous band of foil material is cut such that the continuous flow of sheets is again separated into individual sheets with portions of foil material remaining on the sheet. Cutting of the said at least one continuous band of foil material is performed at positions located on the sheets such that the portions of foil material remaining on the sheets do not extend beyond leading and trailing edges of the sheets.

An installation for carrying out the above method comprises (i) a sheet-by-sheet feeding station for feeding the individual sheets, (ii) a foil application unit for applying the said at least one continuous band of foil material onto the individual sheets, (iii) a cutting unit, located downstream of the foil application unit, for cutting the said at least one continuous band of foil material, and (iv) a sheet delivery station for receiving the individual sheets.

Thanks to the above method and installation, a precise application of the foil material onto the successive sheets is ensured, while guaranteeing that the applied foil material does not cause perturbations during further processing of the sheets in the downstream processes. Indeed, as cutting of the foil material is performed at positions located on the sheets such that the portions of foil material remaining on the sheets do not extend beyond the leading and trailing edges of the sheets, proper alignment of the sheets in the downstream processes (which alignment uses as reference the leading edge of the sheets, or as the case may be the trailing edge) is not affected.

According to one embodiment of the above method and installation, cutting can for instance be performed by mechanical cutting tools without causing damage to the sheets. According to an alternate embodiment, and provided the foil material is made of plastic or any other material that can be melted, cutting can be carried by melting the foil material using a heating element (such as a heated electrical wire). Still according to an alternate embodiment, cutting of the foil material can be carried out using a laser beam. Tests carried out by the Applicant have demonstrated that laser cutting is in particular very efficient at selectively cutting the foil material without damaging the sheets.

A major advantage of laser cutting resides in that the cutting process can be performed in a "touchless" manner, i.e. the laser cutting unit as such is not brought into contact with the foil material, but rather merely the laser beam produced by the laser cutting unit.

A difficulty however arises in connection with the evacuation of the waste portions of the continuous band or bands of foil material that are not to remain on the sheets. Such evacuation is preferably performed by aspiration as suggested in European patent application No. 07103051.4 and International application No. PCT/IB2008/050626. Such difficulty is exacerbated in the case of cutting of the foil material by means of a laser since specific means need to be provided to carry out such evacuation.

SUMMARY OF THE INVENTION

A general aim of the invention is thus to further improve the known methods and installations for applying foil material onto successive sheets.

An aim of the invention is in particular to provide a solution that is less complicated to implement than the known solutions.

A further aim of the present invention is to provide a solution that allows application of foil material in a precise manner onto the sheets.

Still another aim of the present invention is to provide a solution that allows application of foil material onto the sheets without this affecting further processing of the said sheets in the downstream processes.

Yet another aim of the present invention is to provide a solution that is capable of applying a wide range of sizes of portions of foil material onto the sheets.

More precisely, a particular aim of the present invention is to propose a solution of the type proposed in European patent application No. 07103051.4 and International application No. PCT/IB2008/050626 wherein the cutting process is performed by means of a laser beam and wherein waste portions of the continuous band or bands of foil material that are not to remain on the sheets are properly evacuated.

These aims are achieved thanks to the solution defined in the claims.

The method according to the invention comprises the following steps. In a first step, individual sheets are transported in succession along a sheet transport path. In a second step, at least one continuous band of foil material is applied onto the individual sheets along a direction substantially parallel to a direction of displacement of the individual sheets, thereby forming a continuous flow of sheets linked to one another by the said at least one continuous band of foil material. In a third step, the said at least one continuous band of foil material is cut by means of a laser beam such that the continuous flow of sheets is again separated into individual sheets with portions of foil material remaining on the sheet. Cutting of the said at least one continuous band of foil material is performed at positions located on the sheets such that the portions of foil material remaining on the sheets do not extend beyond leading and trailing edges of the sheets. Further, waste portions of said at least one continuous band of foil material that are not to remain on the sheets are evacuated by seizing the waste portions prior to cutting by the laser beam and are held throughout the cutting process. Thanks to the above method, proper evacuation of the waste portions is ensured.

Advantageous embodiments of the invention form the subject-matter of the dependent claims.

According to a preferred embodiment, the waste portions are seized and held by aspiration.

According to another embodiment, the waste portions are transported to an evacuation outlet where the waste portions are released and evacuated.

According to an advantageous embodiment, cutting of the said at least one continuous band of foil material is performed immediately after a leading edge of the sheets and immediately before a trailing edge of the sheets over a whole width of the continuous band of foil material, such that a continuous portion of foil material is left remaining on each sheet. In such case, it is in particular preferable to carry out cutting in unprinted margins of the sheets.

In the context of the invention, the continuous band or bands of foil material can advantageously be supplied in the form of a roll of foil material.

In the context of the production of documents, such as security documents, wherein the sheets each carry an array of imprints arranged in a matrix of rows and columns, at least one continuous band of foil material is applied along each column of imprints.

The present invention is in particular applicable to cover windows or openings cut into the sheets prior to the application of the continuous band or bands of foil material. In this case in particular, it is advantageous to apply a foil material that is substantially transparent.

The foil material is preferably a plastic laminate comprising an adhesive layer which is brought into contact with the surface of the sheets. This adhesive layer is advantageously a pressure-activated and/or thermo-activated adhesive layer which is activated during application only at locations corresponding to the portions of foil material that are to remain on the sheets. Cutting is preferably carried out in this case at locations where the adhesive layer has not been activated, advantageously in an immediate vicinity of the portions of foil material that are to remain on the sheets. In this case, while peripheral portions of the foil material are not adhering to the sheets after the application process, the dimensions thereof can be minimized. Furthermore, it is common practice to subject the sheets after application of foil material to an intaglio printing process, especially in order to overprint the foil material. As a result of intaglio printing, the peripheral portions of the foil material are made to adhere to the sheets due to the combined effect of temperature and pressure inherent to intaglio printing.

An installation for carrying out the above method forms the subject-matter of dependent claims, which installation generally comprises (i) a sheet-by-sheet feeding station for feeding the individual sheets, (ii) a foil application unit for applying the said at least one continuous band of foil material onto the individual sheets, (iii) a laser cutting unit, located downstream of the foil application unit, for cutting the said at least one continuous band of foil material, and (iv) a sheet delivery station for receiving the individual sheets. Said installation further comprises (v) a waste handling unit for seizing and holding waste portions of the said at least one continuous band of foil material, which waste handling unit comprises at least one holding member which is displaced adjacent to the surface of the sheets for seizing the waste portions prior to cutting by the laser beam and holding the waste portions throughout the cutting process.

The holding member advantageously includes at least one suction head for seizing and holding the waste portions by aspiration.

According to another preferred embodiment of the installation, the waste handling unit comprises a conveyor system for displacing the holding member, which conveyor system is located above the surface of the sheets and extends along a direction parallel to the direction of displacement of the sheets. In this context, the conveyor system advantageously includes at least first and second rotating bodies driving at least one chain or belt carrying the holding member, which chain or belt is driven in synchronism with the displacement of the sheets. Preferably, the holding member includes at least one suction head for seizing and holding the waste portions by aspiration, this suction head comprising first and second suction portions for cooperation with the waste portions, the first suction portion being adapted to be coupled to a first rotary air connector provided on the first rotating body and the second suction portion being adapted to be coupled to a second rotary air connector provided on the second rotating body. In this context, the first suction portion can be intermittently coupled to the first rotary air connector by means of a first connecting part carried by the chain or belt, which first connecting part is periodically coupled to an air duct of the first rotary air connector. Similarly, the second suction portion can be intermittently coupled to the second rotary air connector by means of a second connecting part carried by the chain or belt, which second connecting part is periodically coupled to an air duct of the second rotary air connector.

According to yet another embodiment, the holding member can extend transversely to the direction of displacement of the sheets and can be adapted to seize and hold the waste portions of at least two adjacent bands of foil material.

Further embodiments of the invention form the subject-matter of the dependent claims and are discussed below.

BRIEF DESCRIPTION OF THE DRAWINGS

Other features and advantages of the present invention will appear more clearly from reading the following detailed description of embodiments of the invention which are presented solely by way of non-restrictive examples and illustrated by the attached drawings in which.

DETAILED DESCRIPTION OF EMBODIMENTS OF THE INVENTION

Figure 1:
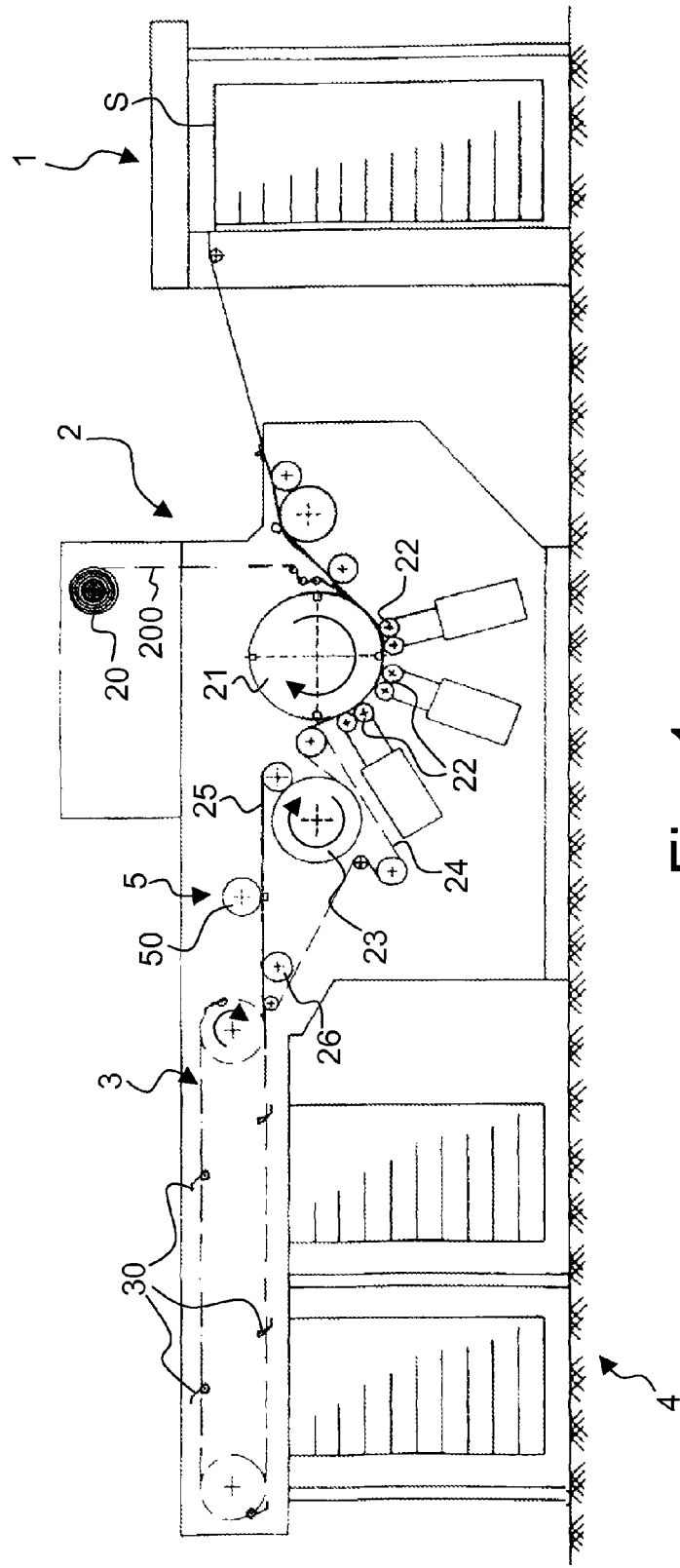
FIG. 1 is a schematic side view of a sheet-fed processing machine for applying foil material onto successive sheets as discussed in European patent application No. 07103051.4 and International application No. PCT/IB2008/050626.

FIG. 1 is a schematic side view of a sheet-fed processing machine for applying foil material onto successive sheets as discussed in European patent application No. 07103051.4 and International application No. PCT/IB2008/050626 discussed hereabove. The configuration thereof is almost identical to the hot-foil stamping machines of the prior art, as for instance disclosed in International applications nos. WO 97/35721 A1, WO 97/35794 A1, WO 97/35795 A1 and WO 97/36756 A1, the disclosures of which are incorporated herein by reference. It comprises a sheet-by-sheet feeding station 1 for feeding individual sheets S to a foil application unit 2, which foil application unit 2 basically comprises an application cylinder 21 (in this case a four-segment cylinder having four segments each capable of seizing and transporting a sheet coming from the sheet-by-sheet feeding station 1) that cooperates with a plurality of rows of pressure rollers 22 which are pressed resiliently against the circumference of the application cylinder 21 by means of pneumatic cylinders (not referenced). In this case, three pairs of rows of pressure rollers 22 are pressed against the circumference of the application cylinder 21.

Foil material is conveniently supplied from a supply roll 20 in the form of a continuous band of foil material 200. This continuous band 200 is fed to the application cylinder 21 so as to be sandwiched between the circumference of the application cylinder 21 and the sheets S. In the context of the production of security documents, such as banknotes, each sheet S is typically provided with an array of imprints P arranged in a matrix of rows and columns (as is for instance illustrated in FIGS. 2 and 3). One will thus understand that at least one supply roll 20 will be provided so as to supply a corresponding band of foil material 200 along each column of imprints P.

The foil material 200 is preferably made of a plastic laminate, preferably substantially transparent, such as, but not limited to, a polyester (PET) or polycarbonate (PC) material, comprising an adhesive layer which is brought into contact with the surface of the sheets. This foil material 200 can optionally be provided with a partially demetallized layer as for instance sold under the name of KINEGRAM zero.zero®, which is a registered trademark of OVD Kinegram AG.

The adhesive layer is preferably a pressure-activated and/or temperature-activated adhesive layer which is activated during application only at locations corresponding to the portions of foil material that are to remain on the sheets. Alternatively, a two-compound adhesive could be used wherein one adhesive compound is applied on the foil material and the other adhesive compound is applied onto the sheets prior to foil application (such as discussed for instance in International application no. WO 2005/068211 A1).

The application cylinder 21 is provided with a plurality of heated stamping members (not shown) at the locations where the foil material 200 is to be applied onto the sheets S. International application no. WO 2005/102733 A2, the disclosure of which is incorporated herein by reference, provides a detailed description of an application cylinder 21 equipped with such stamping members. It suffice to understand that the stamping members are dimensioned according to the portions of adhesive layer to be activated on the foil material 200 and that the pressure rollers 22 are designed for rolling contact with the said stamping members.

For instance, in the context of the embodiment illustrated by FIGS. 2 and 3, which embodiment will be discussed below, it is envisaged to apply each continuous band of foil material 200 so that a continuous portion thereof, designated by reference numeral 200*, is left remaining on each sheet S. In other words, each stamping member on the application cylinder 21 is dimensioned such as to exhibit the shape of a strip the length of which corresponds to the length of adhesive layer to be activated on the band of foil material 200.

Figure 2:
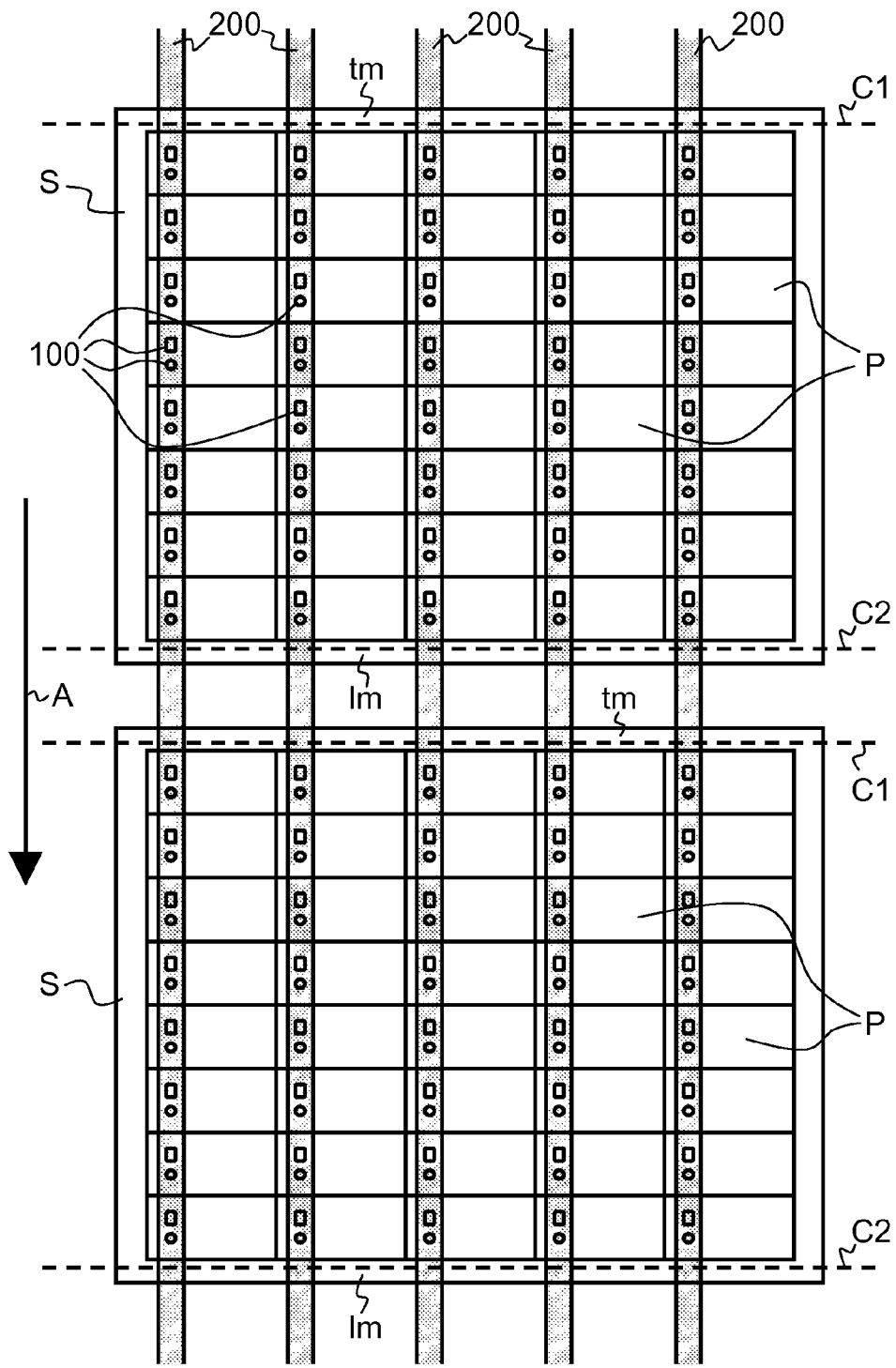
FIG. 2 is a schematic top view of two successive sheets linked to one another by a plurality of continuous bands of foil material which are applied onto the sheets along a direction parallel to a direction of displacement of the sheets.

Following application of the continuous bands of foil material 200 onto the individual sheets S, a continuous flow of sheets S linked to one another by the continuous bands of foil material 200 is formed, as schematically illustrated in FIG. 2.

Referring again to FIG. 1, the continuous flow of sheets S linked by the continuous bands of foil material 200 is fed to a cooling unit comprising a cooling roller 23 cooperating with conveyor belts 24. In the illustrated embodiment, the conveyor belts 24 are driven into rotation so as to turn in a counter-clockwise direction in FIG. 1 and draw the continuous flow of sheets S away from the surface of the application cylinder 21, against the circumference of the cooling roller 23 (which roller 23 rotates in the clockwise direction in FIG. 1), and onto a horizontal guide plate 25.

The cooling unit is not as such required and may be omitted. Tests have however shown that the cooling unit may be advantageous in that it enables stabilization and regulation of the temperature of the processed sheets S as well as of the downstream portion of the foil application unit 2 where the cutting unit, designated by reference numeral 5, is located.

The cutting unit 5 is located downstream of the foil application unit 2, in the vicinity of the horizontal guide plate 25, for cutting the continuous bands of foil material 200. In the illustration of FIG. 1, the cutting unit 5 is a mechanical cutting unit comprising a cutting cylinder 50 as described in greater detail in European patent application No. 07103051.4 and International application No. PCT/IB2008/050626.

Figure 3:
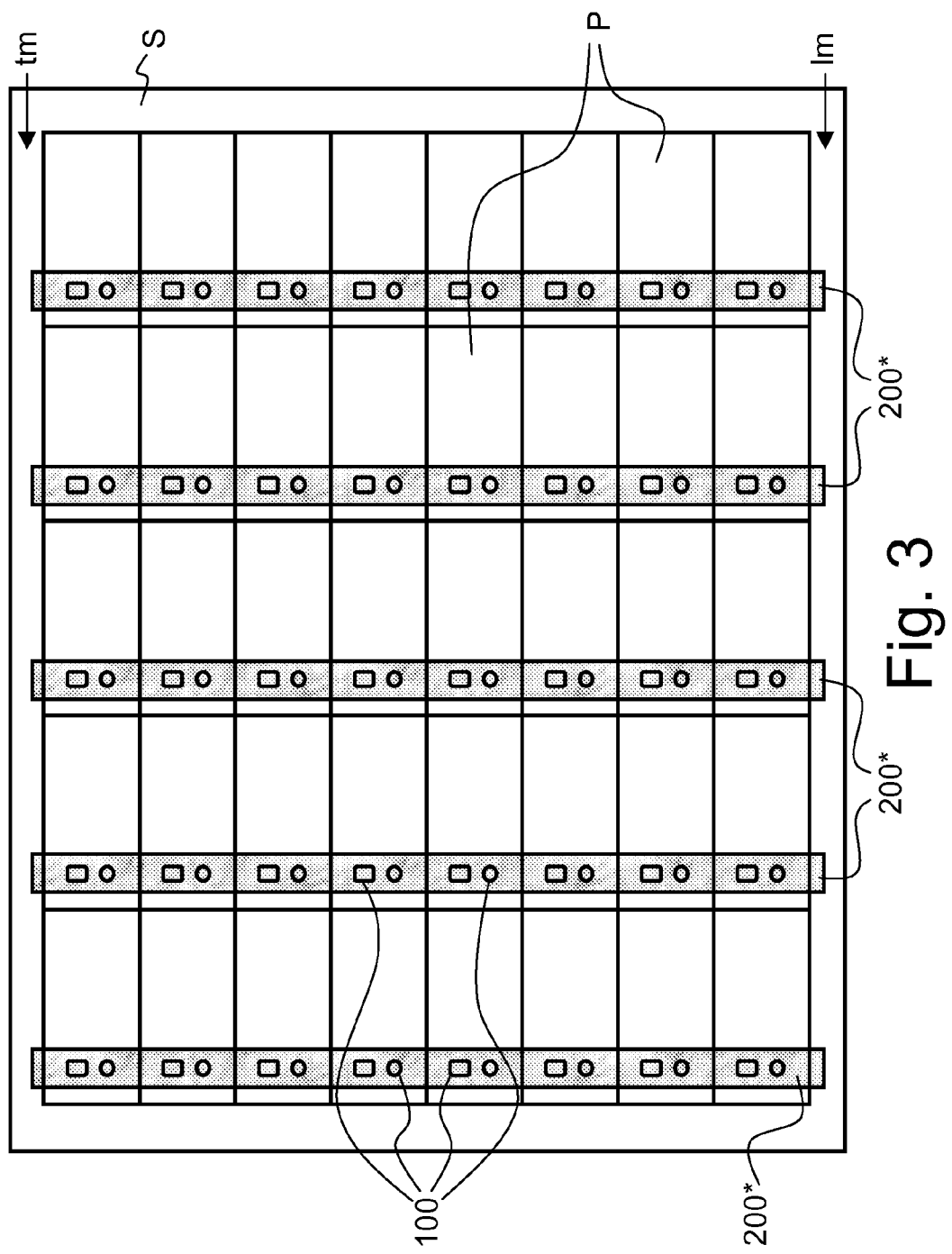
FIG. 3 is a schematic top view of a single sheet after cutting of the plurality of continuous bands of foil material of FIG. 2.

As a result of this cutting, the continuous flow of sheets S is again separated into individual sheets S with portions of foil material, designated by reference numeral 200* in FIG. 3, remaining on the sheets S. Such separation is necessary as the sheets S are to be transferred to a downstream-located chain conveyor system, designated generally by reference numeral 3 in FIG. 1.

As illustrated in FIG. 1, a suction drum 26 is located below the conveyor belts 24, downstream of the guide plate 25 and of the cutting unit 5. The circumferential surface of the suction drum 26 is tangent upon the plane in which the sheets S are conveyed in this region. The suction drum 26 preferably has a dedicated speed-controllable and/or position-controllable drive (not shown), comprising for instance an electric motor the speed of which can be adjusted. A circumferential speed of the suction drum 26 is controlled in such a manner that the suction drum 26 is initially at the conveying speed of the conveyor belts 24, is then accelerated to a speed which is slightly greater than the speed of the chain conveyor system 3, and is then decelerated again in order to permit transfer of the sheet S with which the suction drum 26 cooperates to a corresponding one of the gripper bars 30 of the chain conveyor system 3. Once transferred to the chain conveyor system 3, the processed sheets are then conveyed to a delivery pile unit of a sheet delivery station 4.

FIG. 2 is a schematic illustration of the flow of sheets S as it would be formed as a result of the application of the continuous bands of foil material 200 downstream of the application cylinder 21 in FIG. 1. In FIG. 2, reference numeral 100 designates windows that have been provided in the sheets S prior to the application of the continuous bands of foil material 200. Such windows 100 might be provided on-line in the same processing machine where the foil material 200 is applied (as for instance proposed in International application no. WO 2004/096541 A1) or in a separate machine.

In FIG. 2, which illustrates sheets S each carrying an array of imprints P arranged in eight rows and five columns (which matrix arrangement is purely illustrative), five continuous bands of foil material 200 are applied along a direction parallel to the sheet transport direction (indicated by the vertical arrow A in FIG. 2), i.e. one continuous band 200 per column of imprints P. It shall be appreciated that more than one continuous band of foil material 200 could be applied per column of imprints P, for instance in case windows 100 are provided at more than one location along the length (i.e. transversely to the sheet transport direction) of each imprint P. In the illustrated example, each imprint P is provided with two windows 100 that are covered by the same band of foil material 200.

In FIG. 2, references lm and tm respectively designate a leading margin and trailing margin of the sheets S, i.e. portions of the sheets that do not carry any imprint P. While these margins will also be referred to as "unprinted margins", it shall be understood that such margins could nevertheless be provided with printed markings, for instance markings that are exploited in the context of logistic and/or quality management of the sheets.

In FIG. 2, the dashed lines designated by references C1 and C2 at the trailing and leading portions of the sheets, respectively, are indicative of the locations where cutting operations are to be carried out in the context of this embodiment. In other words, according to this embodiment, the continuous bands of foil material 200 are cut immediately after a leading edge of the sheets S (more precisely within the unprinted leading margin lm) and immediately before a trailing edge of the sheets S (more precisely within the unprinted trailing margin tm) over a whole width of the continuous bands 200. As a result, as illustrated by FIG. 3, continuous portions of foil material, which portions are designated by reference numerals 200*, are left remaining on each sheet S.

Figure 4:
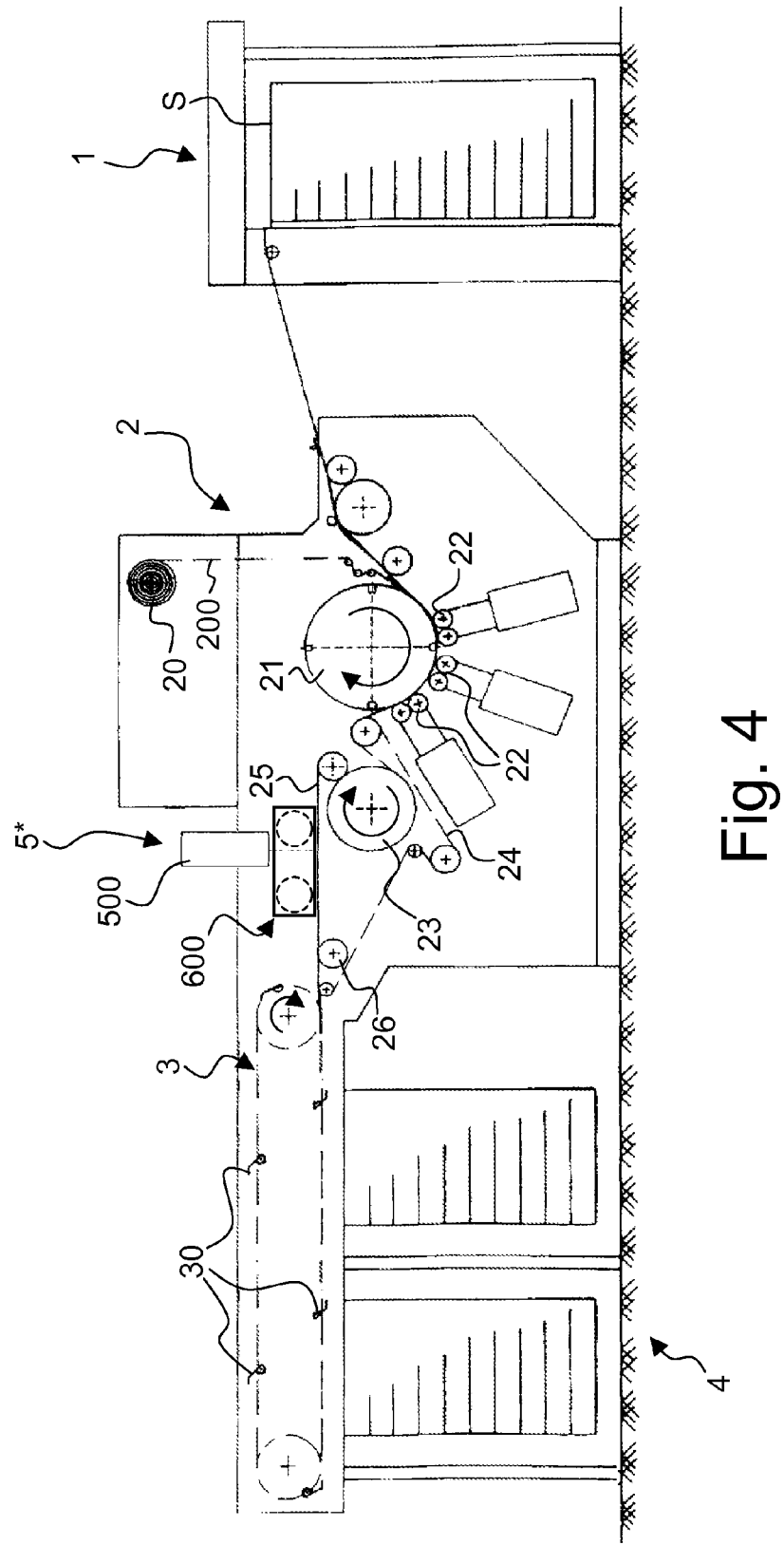
FIG. 4 is a schematic side view of a sheet-fed processing machine for applying foil material onto successive sheets according to one embodiment of the invention.

FIG. 4 schematically illustrates an embodiment of an installation for carrying out the method of the invention, which embodiment differs from the one illustrated in FIG. 1 in that the mechanical cutting system 5, 50 is replaced by a laser cutting unit 5*. All other constituent parts of the installation are identical to those of the installation illustrated in FIG. 1 and are accordingly designated by the same reference numerals as in FIG. 1. As this will become apparent hereafter, the laser cutting unit 5* comprises in this embodiment a plurality of laser units 500 (namely three units) disposed above the horizontal guide plate 25, the laser beams generated by the laser units 500 being directed downwards towards the surface of the sheets S being transported thereunder. A waste handling unit 600 for seizing and holding waste portions of the continuous band of foil material 200 that are cut by the laser cutting unit 5* is placed immediately above the path of the sheets S, below the laser cutting unit 5*. The purpose of the waste handling unit 600 is to seize waste portions of the continuous band of foil material 200 prior to cutting and to hold these waste portions throughout the cutting process, so that the waste portions are properly evacuated.

These laser units 500 may be any suitable laser units, such as $CO_2$-type laser units or Nd—YAG-type laser units, as commercially available from e.g. Macsa Laser Solutions (www.macsalaser.com) and KBA-Metronic (www.kba-metronic.com). A 60 W $CO_2$-type laser unit available from the above suppliers under the product designation "K-1060 Plus" was successfully used to carry out the cutting process.

In the preferred embodiment, one laser unit 500 is used to perform cutting of two neighbouring continuous bands of foil material 200 applied on the sheets. Depending on the application, only one or more than two neighbouring bands of foil material 200 could be cut by one and the same laser unit 500. Each laser unit 500 may carry out a cutting operation over a distance, transversely to the direction of displacement of the sheets, of about 200 to 250 millimeters. In other words, the three laser units 500 may jointly cover a distance of 600 to 750 millimeters, which is sufficient to process most sheet formats used in the context of the production of security documents. More than three laser units may of course be used in case of necessity.

An embodiment of the waste handling unit 600 will now be described in reference to FIGS. 5 to 18.

Figure 16:
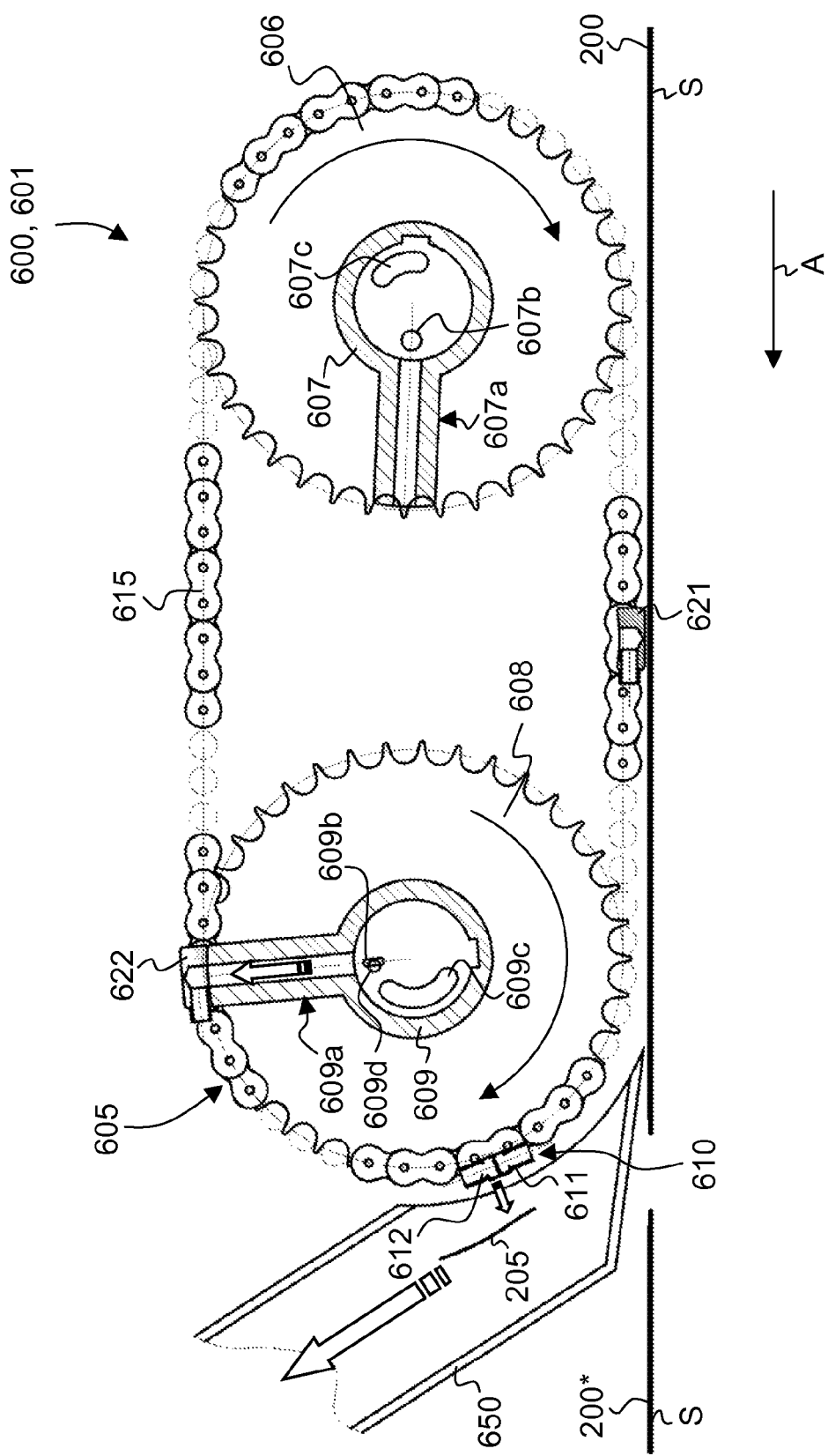
Figure 17:
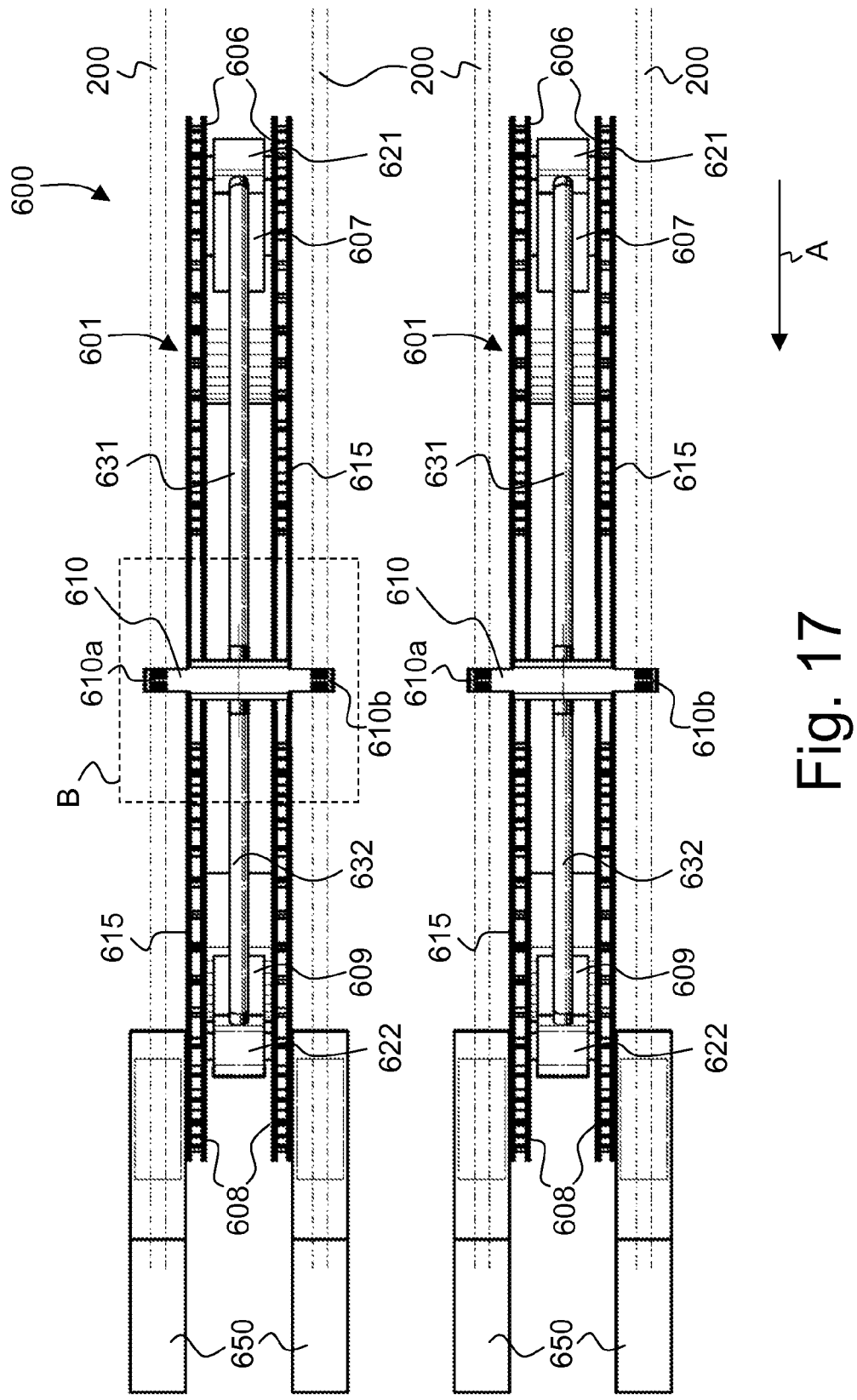
FIG. 17 is an underside schematic view of part of the waste handling unit of FIGS. 5 to 16.

The embodiment of the waste handling unit 600 comprises, as illustrated in FIG. 17 which is an underside view of the waste handling unit 600, a plurality of sub-units 601 of identical configuration placed one next to the other and extending along a direction parallel to the direction of displacement of the sheets S which is indicated by the arrow A in FIGS. 5 to 18 (i.e. the sheets S and continuous bands of foil material 200 are moving from right to left in FIGS. 5 to 18). Only two sub-units 601 are illustrated in FIG. 17, but more than two such sub-units could be provided depending on the number of continuous bands of foil material 200 to process.

As illustrated in FIG. 17, each sub-unit 601 is advantageously adapted to cooperate with two neighbouring continuous bands of foil material 200. To this end, each sub-unit 601 of the waste handling unit 600 comprises at least one holding member 610 which is displaced adjacent to the surface of the sheets S for seizing and holding the waste portions 205 of the continuous bands of foil material 200 produced as a result of the cutting process. While not specifically illustrated, it shall be understood that each laser unit 500 is disposed above the sub-units 601 such as to perform laser cutting of two neighbouring continuous bands of foil material 200 between the sub-units 601, as explained above.

Figure 18:
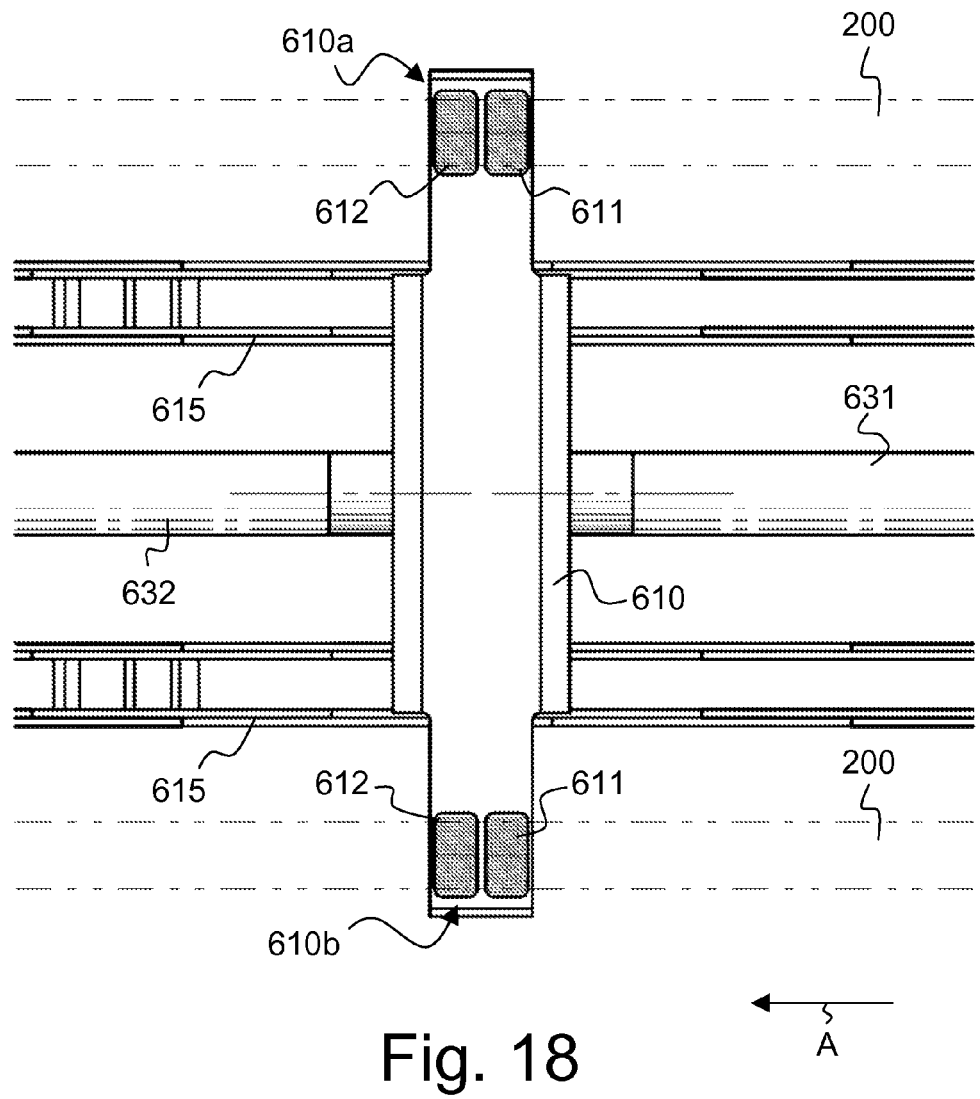
FIG. 18 is an enlarged view taken from FIG. 17 of a holding member of the waste handling unit.

In this embodiment, the holding member 610 extends transversely to the direction of displacement of the sheets S and is adapted to seize and hold the waste portions 205 of the two adjacent bands of foil material 200 (see enlarged view of FIG. 18 which corresponds to the portion indicated by the rectangle B in FIG. 17). The waste portions 205 are transported by the holding members 610 to corresponding evacuation outlets 650 provided at the downstream end of each sub-unit 601 along the path of the continuous bands of foil material 200.

Displacement of each holding member 610 is ensured by an endless conveyor system 605, which conveyor system 605 is located above the surface of the sheets S and extends along a direction parallel to the direction of displacement A of the sheets. This endless conveyor system 605 is preferably driven by a separate drive (not illustrated), such as a servo-motor.

The conveyor system 605 includes at least first and second rotating bodies 606, 608, such as wheels or drums, driving at least one endless chain 615 carrying the holding member 610, which chain 615 is driven in synchronism with the displacement of the sheets S. A belt or any other type of endless conveyor device could alternatively be used in place of the chain 615. According to the embodiment illustrated in FIGS. 5 to 18, each sub-unit 601 comprises a pair of first rotating bodies 606 and a pair of second rotating bodies 608 driving a pair of chains 615, the holding member 610 being held between the pair of chains 615 (see FIGS. 17 and 18). A separate drive (not illustrated) is preferably provided to drive the first rotating bodies 606 (or second rotating bodies 608) of all sub-units 601 so that the holding member 610 is displaced in synchronism with the passage of the sheets S and continuous bands of foil material 200. In FIGS. 5 to 16, the rotating bodies 606, 608 and chains 615 rotate in the clockwise direction.

Each holding member 610 preferably includes at least one suction head for seizing and holding the waste portions of foil material by aspiration. In the embodiment illustrated in FIGS. 5 to 18, each holding member 610 comprises two suction heads 610a, 610b each comprising first and second suction portions 611, 612 for cooperation with the waste portions 205. Advantageously, the first suction portion 611 is adapted to be coupled to a first rotary air connector 607 provided on the first rotating body 606, while the second suction portion 612 is adapted to be coupled to a second rotary air connector 609 provided on the second rotating body 608. Each suction portion 611, 612 thus cooperates with its own rotary air connector 607, 609 to selectively aspirate a corresponding part of the waste portions 205 as this will be described hereinafter.

Advantageously, the first suction portion 611 is intermittently coupled to the first rotary air connector 607 by means of a first connecting part 621 carried by the chains 615 (and thus moving in synchronism with the holding member 610). This first connecting part 621 is periodically coupled to an air duct 607a of the first rotary air connector 607 depending on its position with respect to the first rotating body 606. A first connecting pipe 631 (not illustrated in FIGS. 5 to 16 but visible in FIGS. 17 and 18) permanently couples the first connecting part 621 to the first suction portion 611 of the suction heads 610a, 610b. When the first connecting part 621 is coupled mechanically to the first rotary air connector 607, air can be sucked through the first suction portion 611 of the holding member 610 via the first connecting pipe 631, the first connecting part 621 and the air duct 607a of the first rotary air connector 607.

Similarly, the second suction portion 612 is intermittently coupled to the second rotary air connector 609 by means of a second connecting part 622 also carried by the chains 615. This second connecting part 622 is periodically coupled to an air duct 609a of the second rotary air connector 609 depending on its position with respect to the second rotating body 608. A second connecting pipe 632 (not illustrated in FIGS. 5 to 16 but visible in FIGS. 17 and 18) permanently couples the second connecting part 622 to the second suction portion 612 of the suction heads 610a, 610b. When the second connecting part 622 is coupled mechanically to the second rotary air connector 609, air can be sucked through the second suction portion 612 of the holding member 610 via the second connecting pipe 632, the second connecting part 622 and the air duct 609a of the second rotary air connector 609.

Connection to a source of air under depression (not shown) is ensured at appropriate times through each rotary air connector 607, 609 thanks to the cooperation of adequate pairs of mutually-cooperating air ports 607b, 607c and 609b, 609c provided at each rotary air connector 607, 609. More precisely, ports 607c and 609c are stationary and are coupled to the source of air under depression, while ports 607b and 609b, which communicate with the corresponding air ducts 607a, 609a, rotate together with the rotary air connectors 607, 609 and associated rotating bodies 606, 608. Depending on the angular position of each rotary air connector 607, 609, the ports 607b and 607c, respectively 609b and 609c, may communicate with one another to allow air to be aspirated through the corresponding air duct 607a, 609a, which communication is permitted when there is an overlap between the corresponding ports 607b, 607c, respectively 609b, 609c.

An additional air port 609d is provided on the second rotary air connector 609, which additional port 609d is also stationary, but is coupled to a source of air (not shown) to briefly blow air through the second suction portion 612 of the holding member 610 as this will be explained hereinafter.

As illustrated, the first and second rotary air connectors 607 and 609 basically each comprise a central region where the air ports 607b, 607c, respectively 609b, 609c, 609d, are located, which central region communicates with the associated air duct 607a, respectively 609a, that extends radially towards the periphery of the corresponding rotating body 606, respectively 608, for cooperation with the relevant connecting part 621, respectively 622.

One will now explain how the above-described waste handling unit 600 operates in reference to FIGS. 5 to 16 which illustrated successive operating states of the waste handling unit 600.

Figure 5:
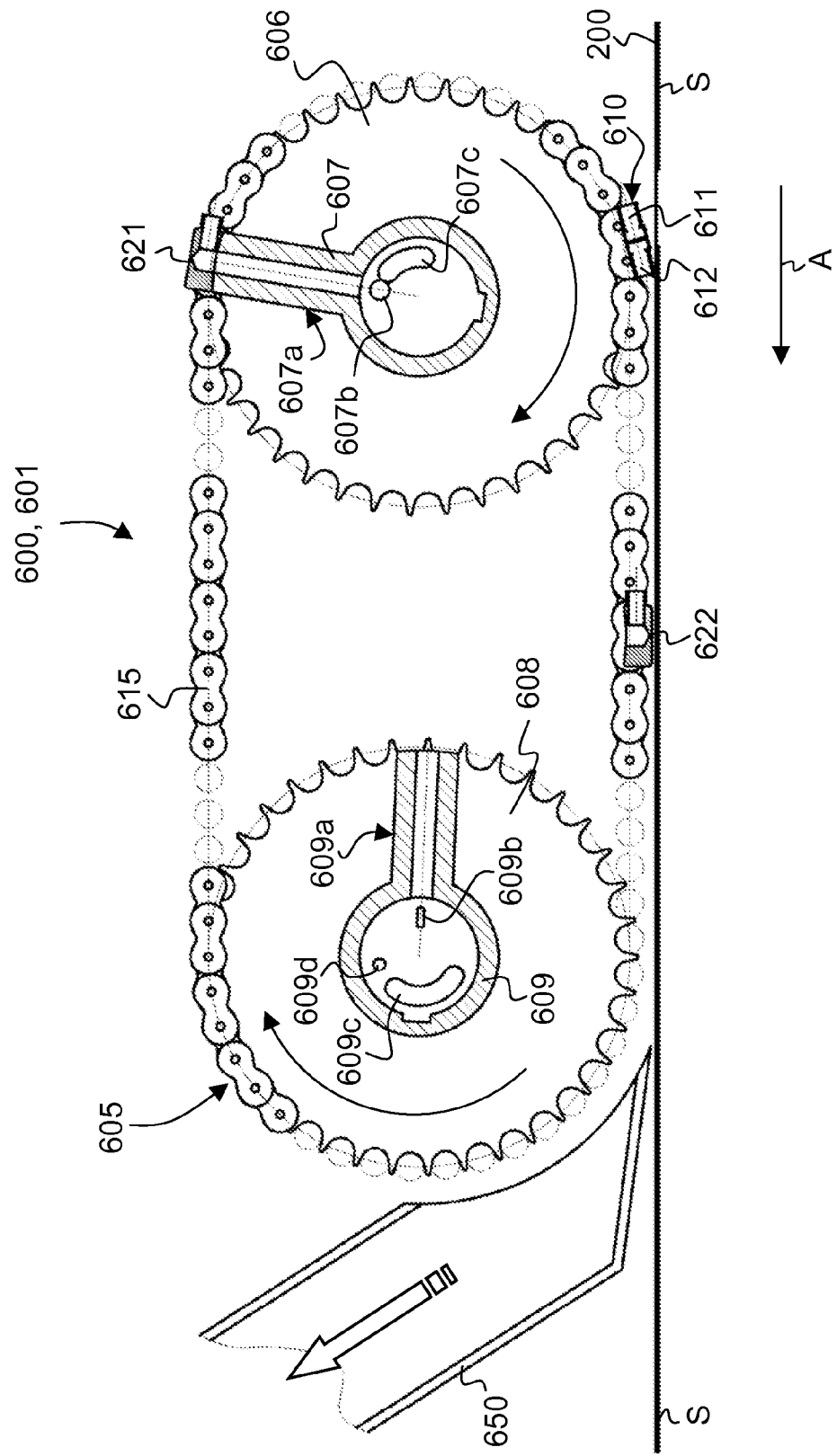
FIGS. 5 to 16 are schematic side views illustrating successive operating states of a preferred embodiment of a waste handling unit according to the invention designed to seize waste portions of continuous bands of foil material applied onto successive sheets prior to the cutting process and to hold such waste portions throughout the cutting process so as to be evacuated.

FIG. 5 illustrates a first operating state wherein the first connecting part 621 is mechanically coupled to the corresponding air connector 607 provided on the first rotating body 606. At this time, the ports 607b and 607c are about to communicate with one another. On the other hand the holding member 610 is about to be brought in contact with a portion of the continuous band of foil material 200 that has been applied on the successive sheets S and which will ultimately have to be evacuated following the cutting process, while the second connecting part 622 is mechanically decoupled from the corresponding rotary air connector 609. In the operating state illustrated in FIG. 5, air is accordingly about to be sucked through the first suction portion 611 of the holding member 610, while no air is sucked through the second suction portion 612 of the holding member 610.

Figure 6:
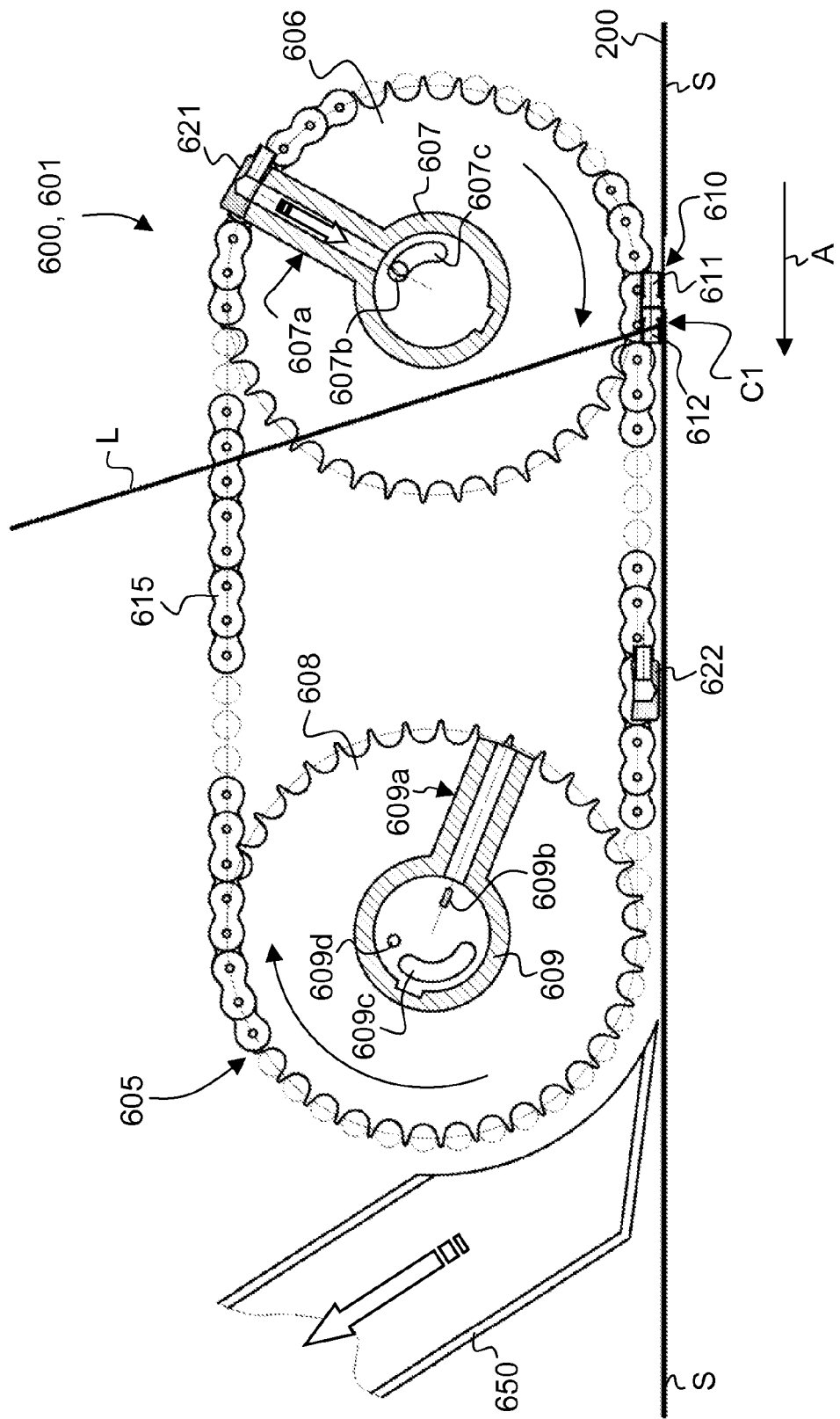

FIG. 6 illustrates a subsequent operating state wherein the holding member 610 has been brought into contact with the relevant portion of the continuous band of foil material 200, which portion is seized and held by the holding member 610 through the application of air under depression via the first suction portion 611, the air ports 607b and 607c of the rotary air connector 607 communicating with one another. At this stage, the second connecting part 622 is still decoupled from the corresponding rotary air connector 609 and no air is aspirated through the second suction portion 612.

Figure 7:
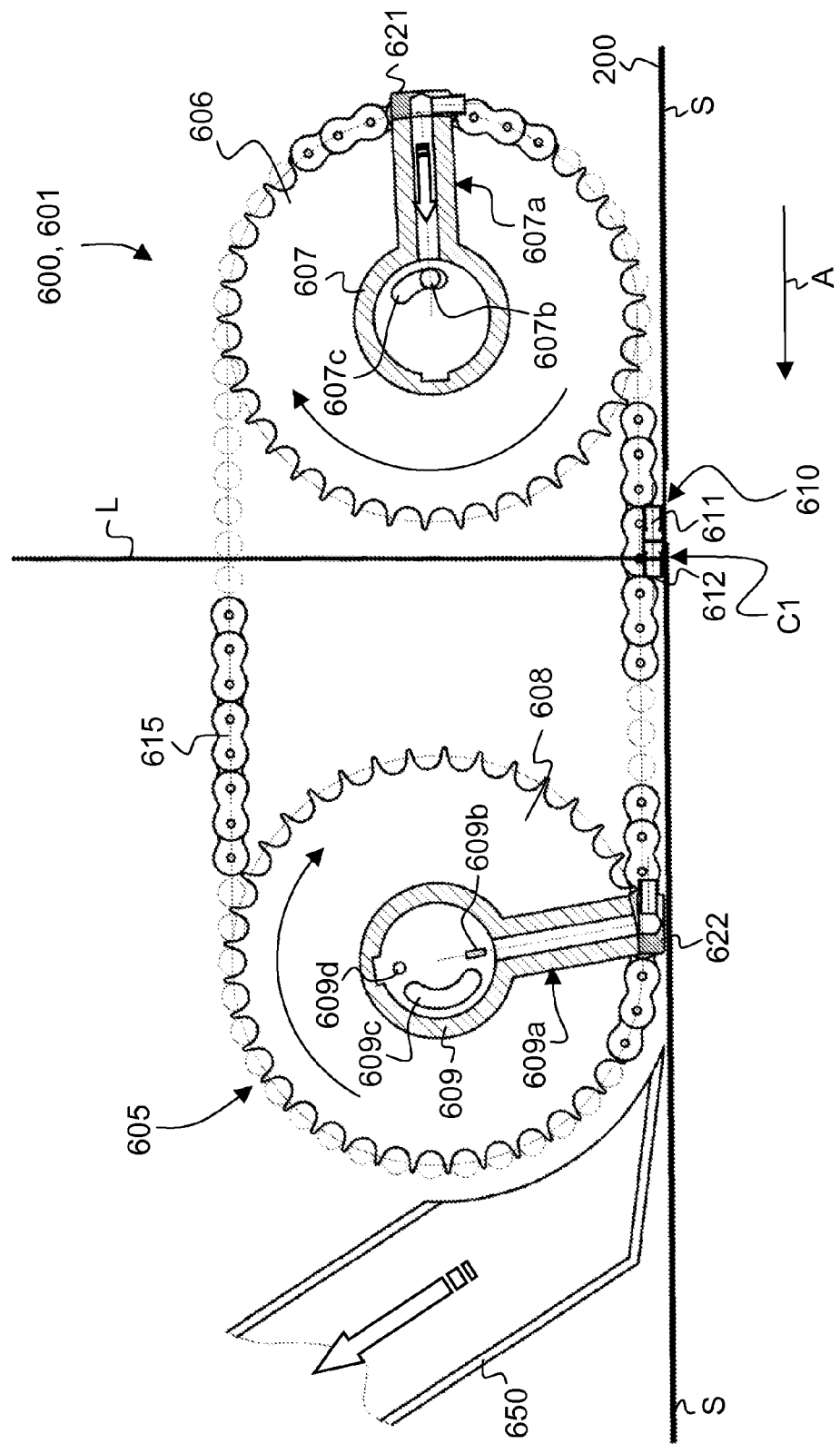

As illustrated in FIG. 6, the cutting process is started, the corresponding laser unit 500 of the laser cutting unit 5* being activated so that the resulting laser beam L is directed onto the relevant part of the continuous band of foil material 200 to be cut. This corresponds to the first cutting operation performed at the trailing portion of each sheet S as depicted by the dashed line C1 in FIG. 2. This cutting operation is continued as the sheets S and continuous bands of foil material 200 are moving and until the foil material 200 has been entirely cut along the cutting line C1 as depicted in FIG. 7. In this subsequent operating state, the second connecting part 622 is about to be coupled mechanically to its corresponding rotary air connector 609.

Figure 8:
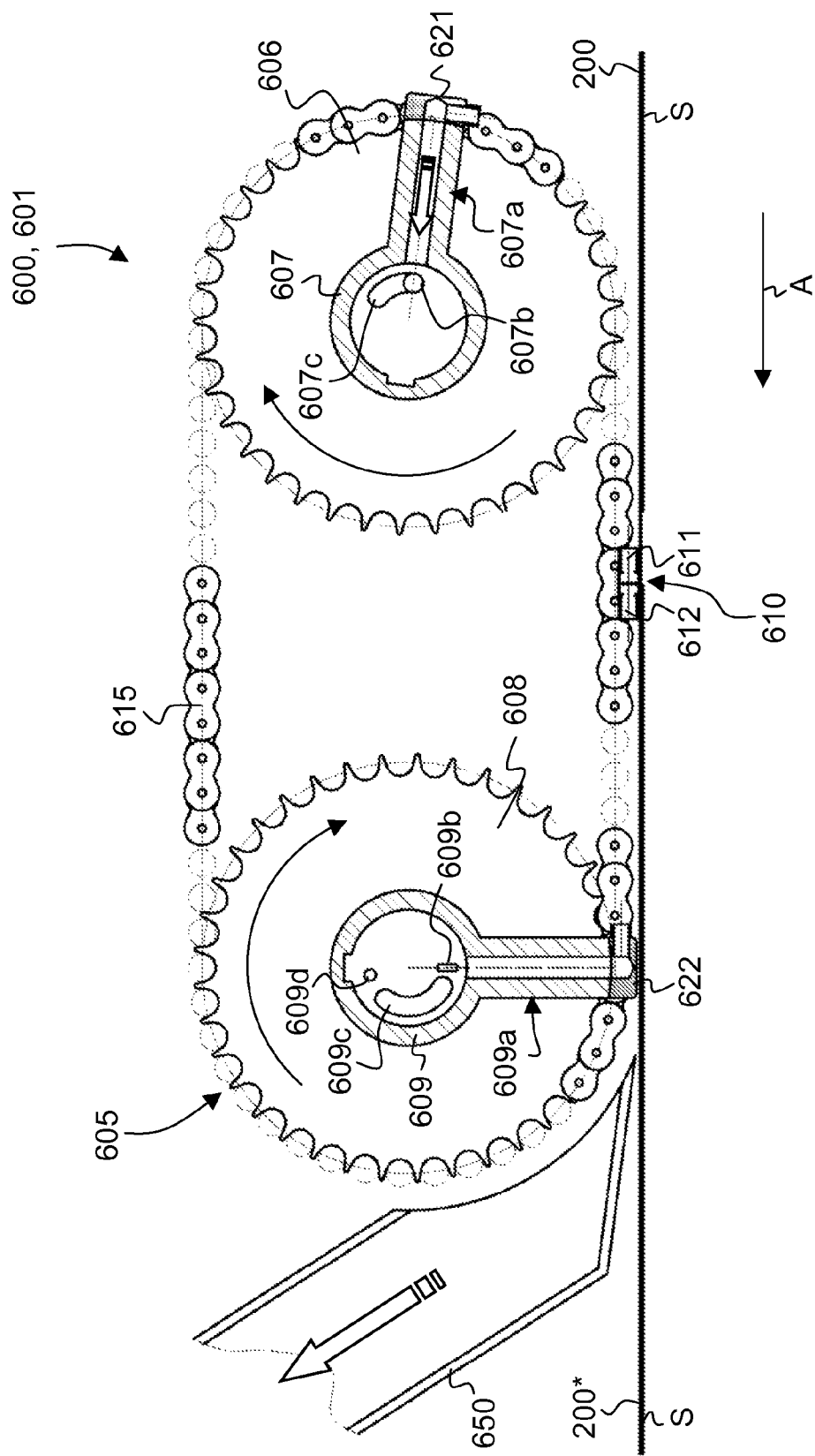

FIG. 8 shows the immediately following operating state where the second connecting part 622 is coupled mechanically to its corresponding rotary air connector 609 and where the continuous portion 200* of foil material is formed on the downstream-located sheet S as a result of the performance of the first cutting operation along cutting line C1.

Figure 9:
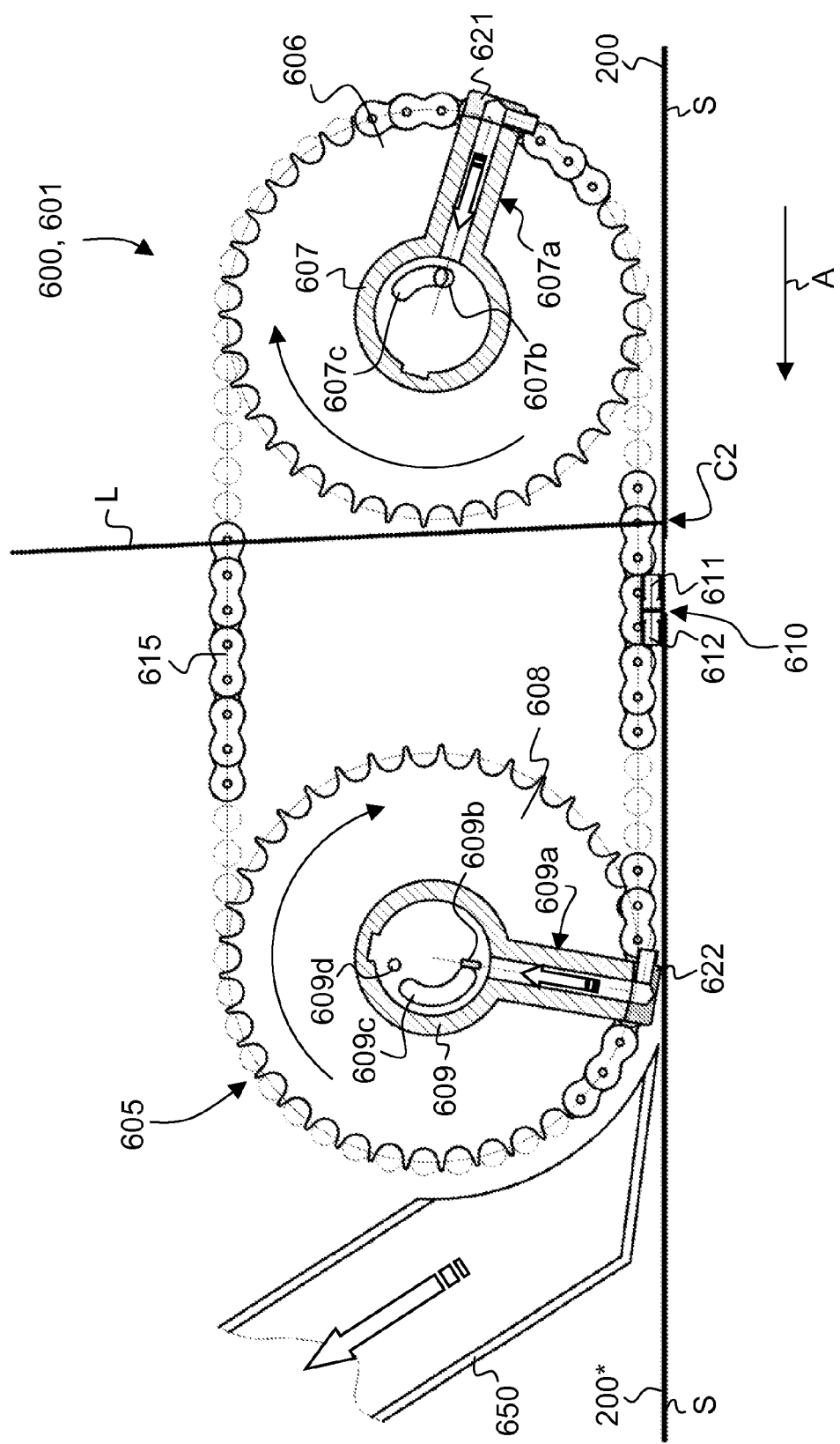

Once the mechanical coupling between the second connecting part 622 and the second rotary air connector 609 has been effected, air can be aspirated through the corresponding suction portion 612 of the holding member 610, which happens as a result of the communication between the ports 609b and 609c of the second rotary air connector 609 starting from the operating state depicted in FIG. 9. At this stage, air is sucked through both suction portions 611 and 612 of the holding member 610.

At the same time, the second cutting operation at the leading portion of the subsequent sheet S, which second cutting operation corresponds to cutting line C2 in FIG. 2, can start, as illustrated in FIG. 9. This cutting operation is continued as the sheets S and continuous bands of foil material 200 are moving and until the foil material 200 has been entirely cut along the cutting line C2 as depicted in FIGS. 10 and 11, thereby forming a corresponding waste portion 205 of foil material.

Figure 10:
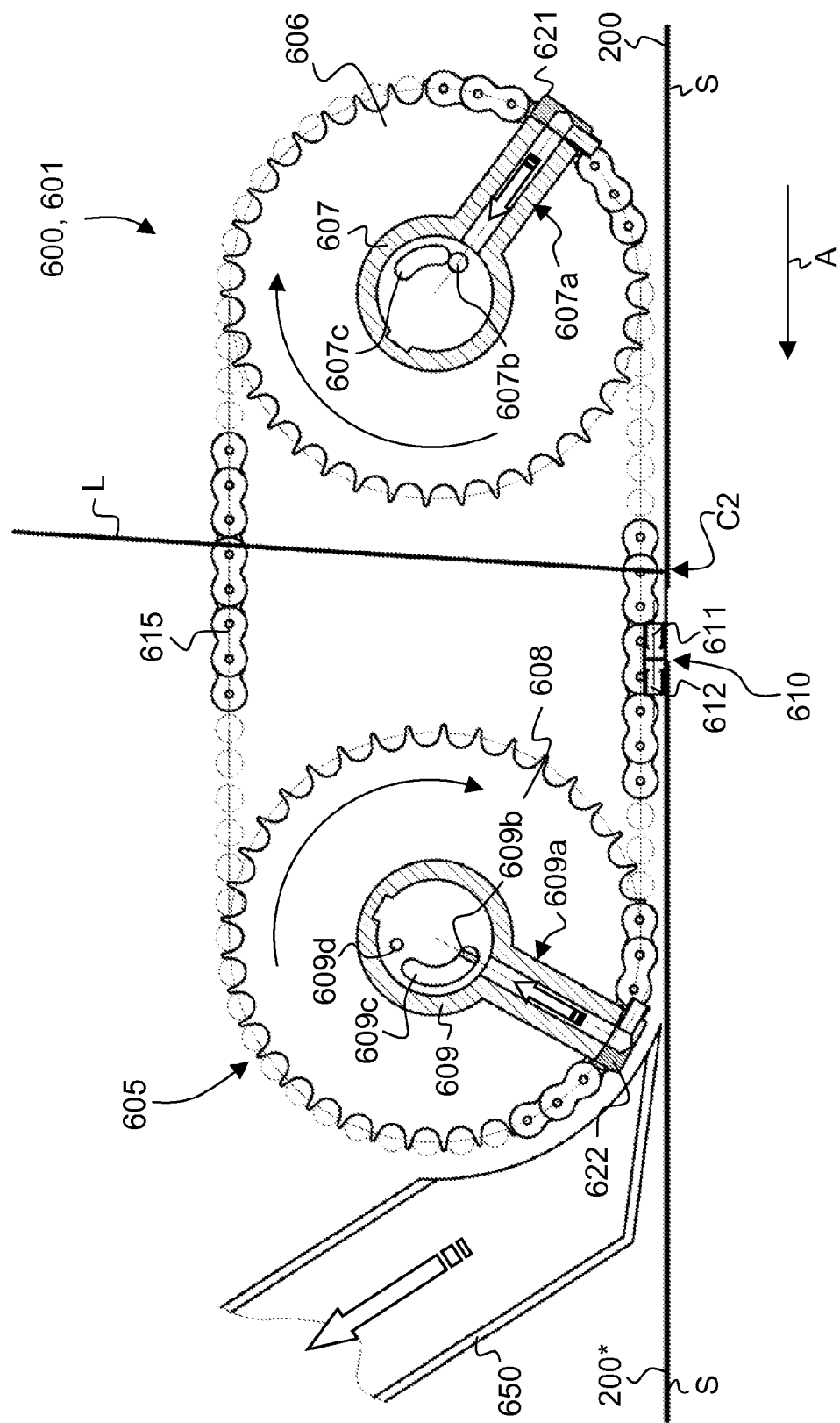

In the operating state illustrated in FIG. 10, the communication between the ports 607b and 607c of the first rotary air connector 607 is about to come to an end, thereby interrupting the suction through the first suction portion 611 of the holding member 610, the waste portion 205 of foil material 200 being however still appropriately held against the holding member 610 as a result of the suction through the second suction portion 612 which is connected to the second rotary air connector 609.

Figure 11:
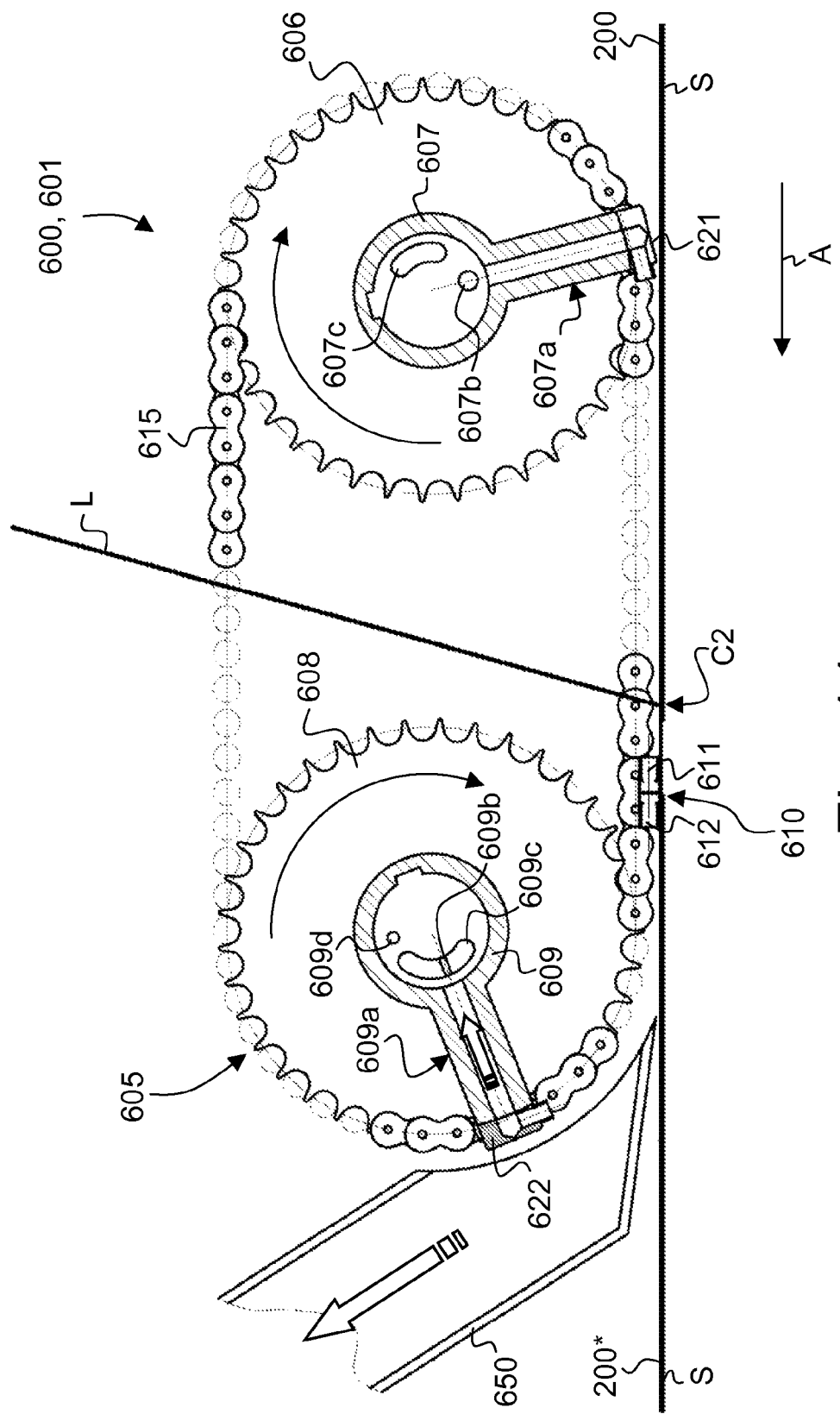
Figure 12:
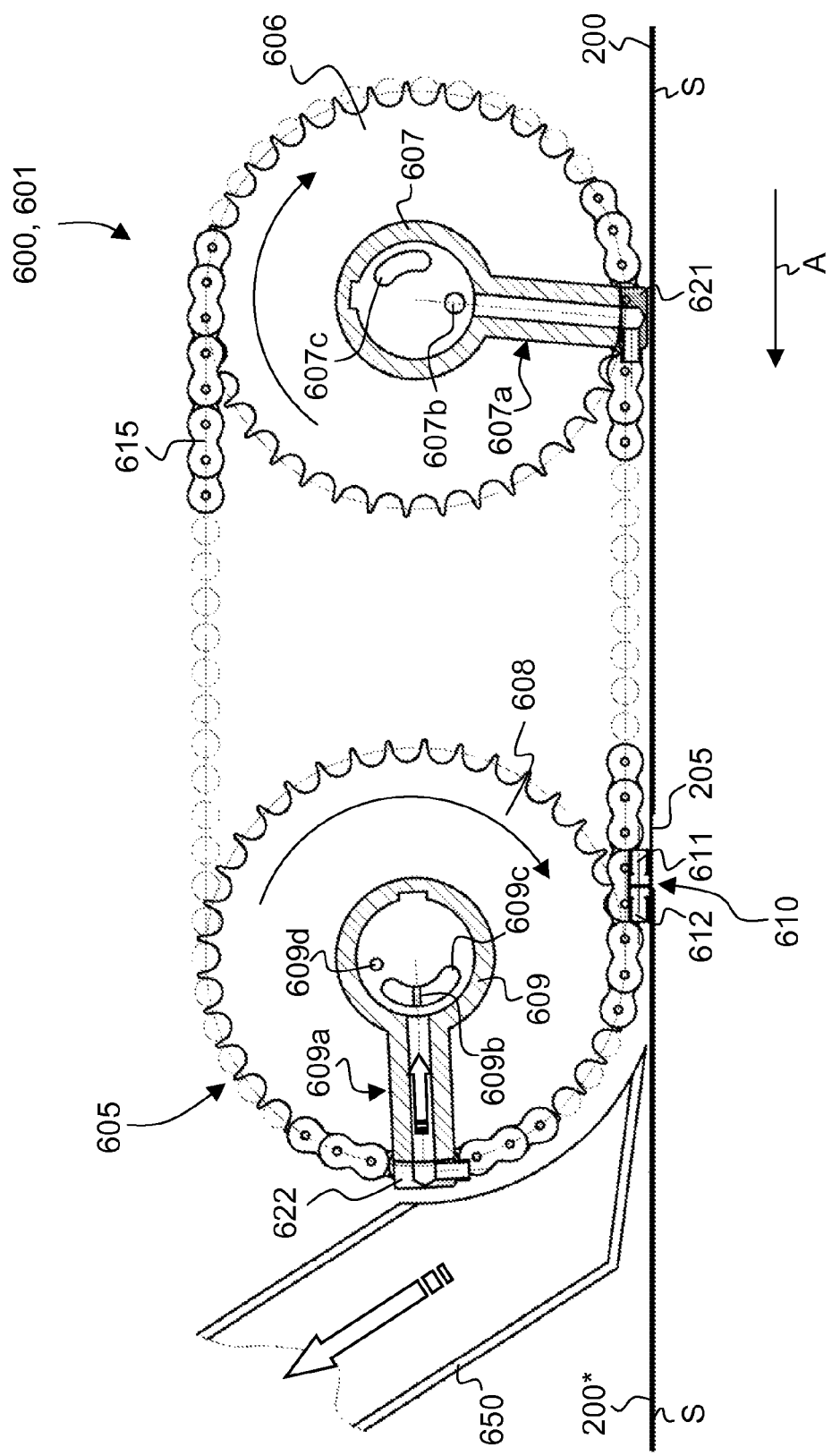
Figure 13:
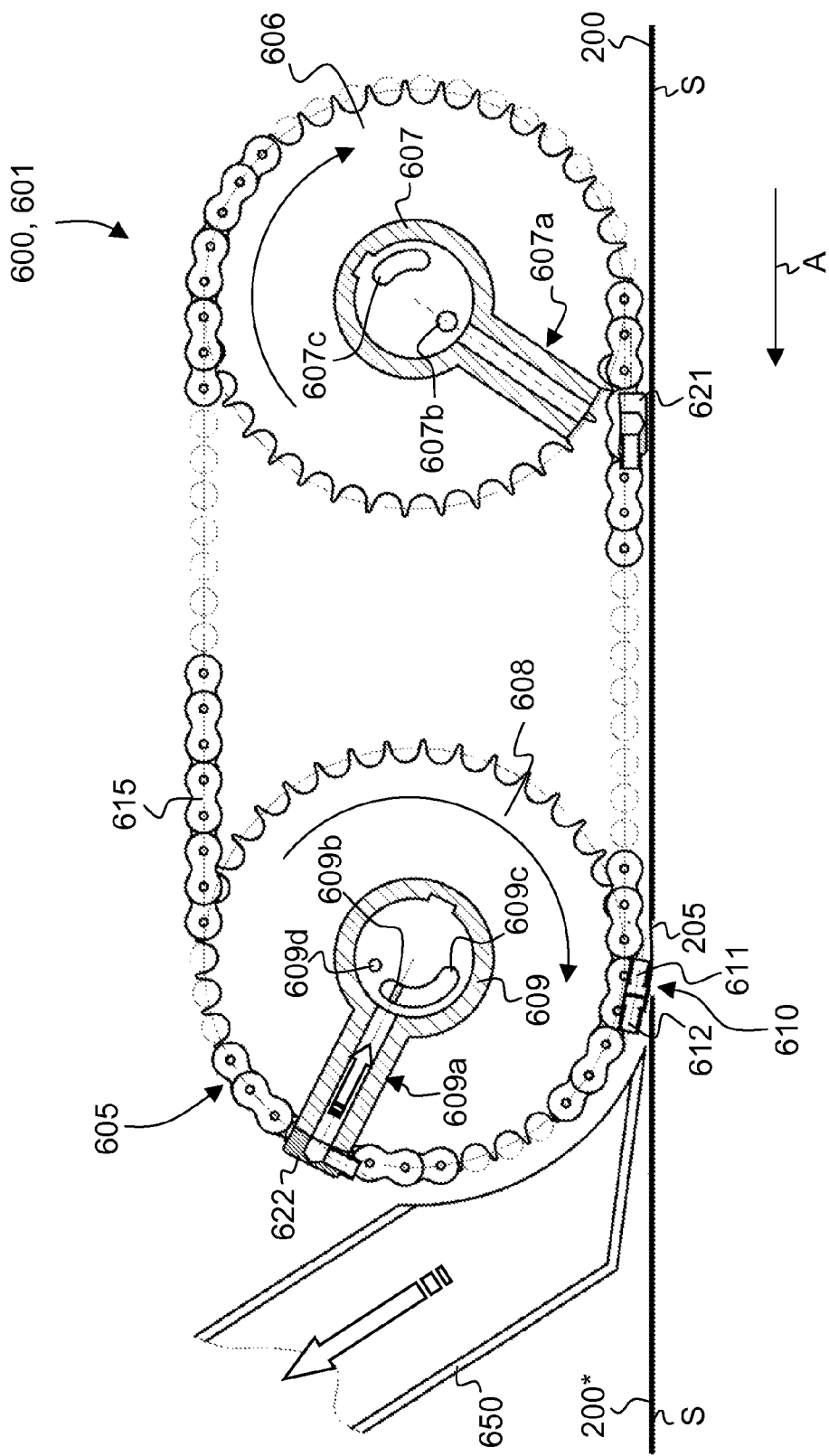
Figure 14:
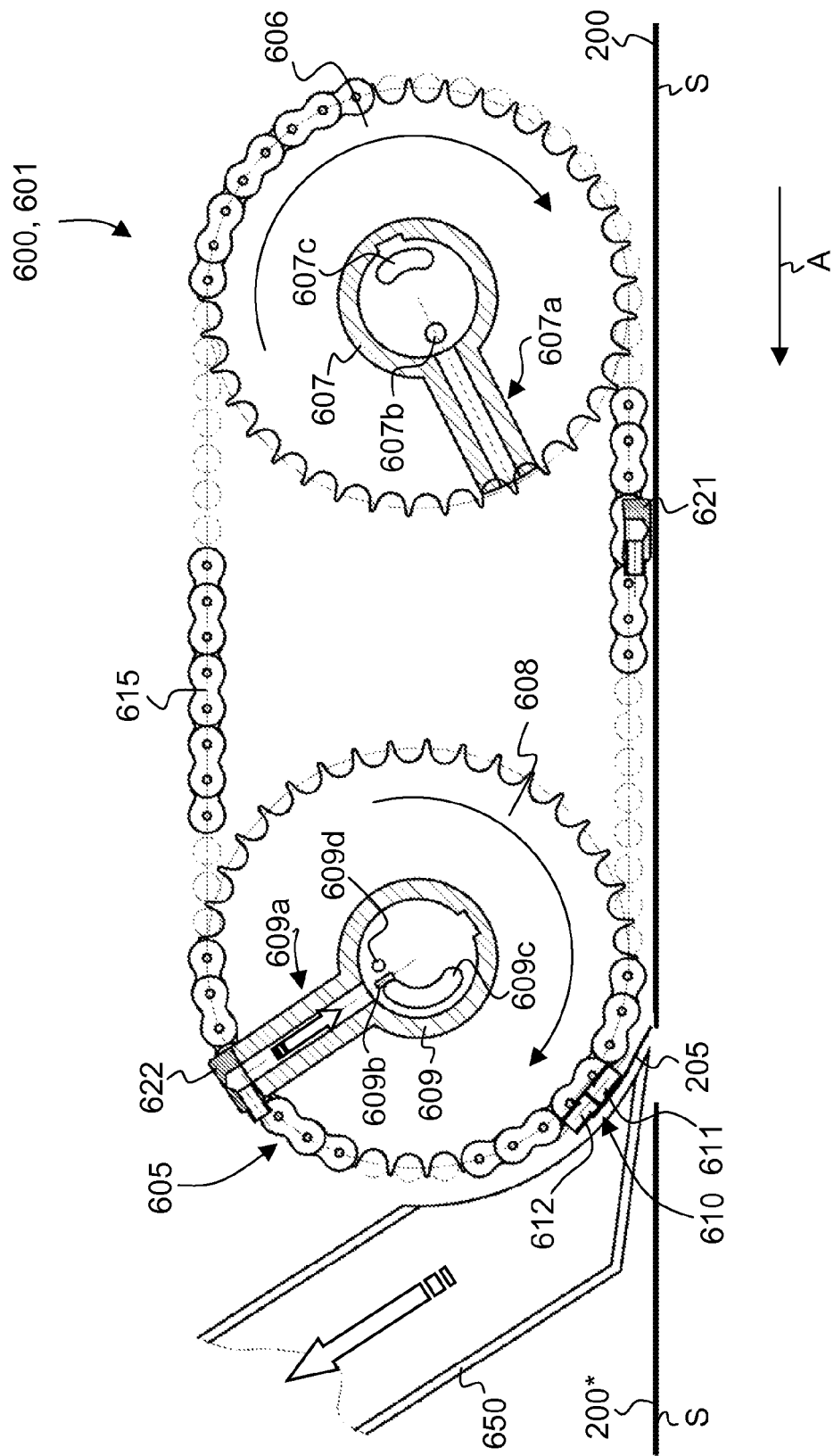

In the operating state illustrated in FIG. 11, suction through the first suction portion 611 of the holding member 610 is completely interrupted and the first connecting part 621 is about to be decoupled mechanically from its corresponding rotary air connector 607. Such decoupling of the first connecting part 621 from the first rotary air connector 607 happens as the holding member 610 moves towards the evacuation outlet 650 as illustrated in FIGS. 12 and 13.

Figure 15:
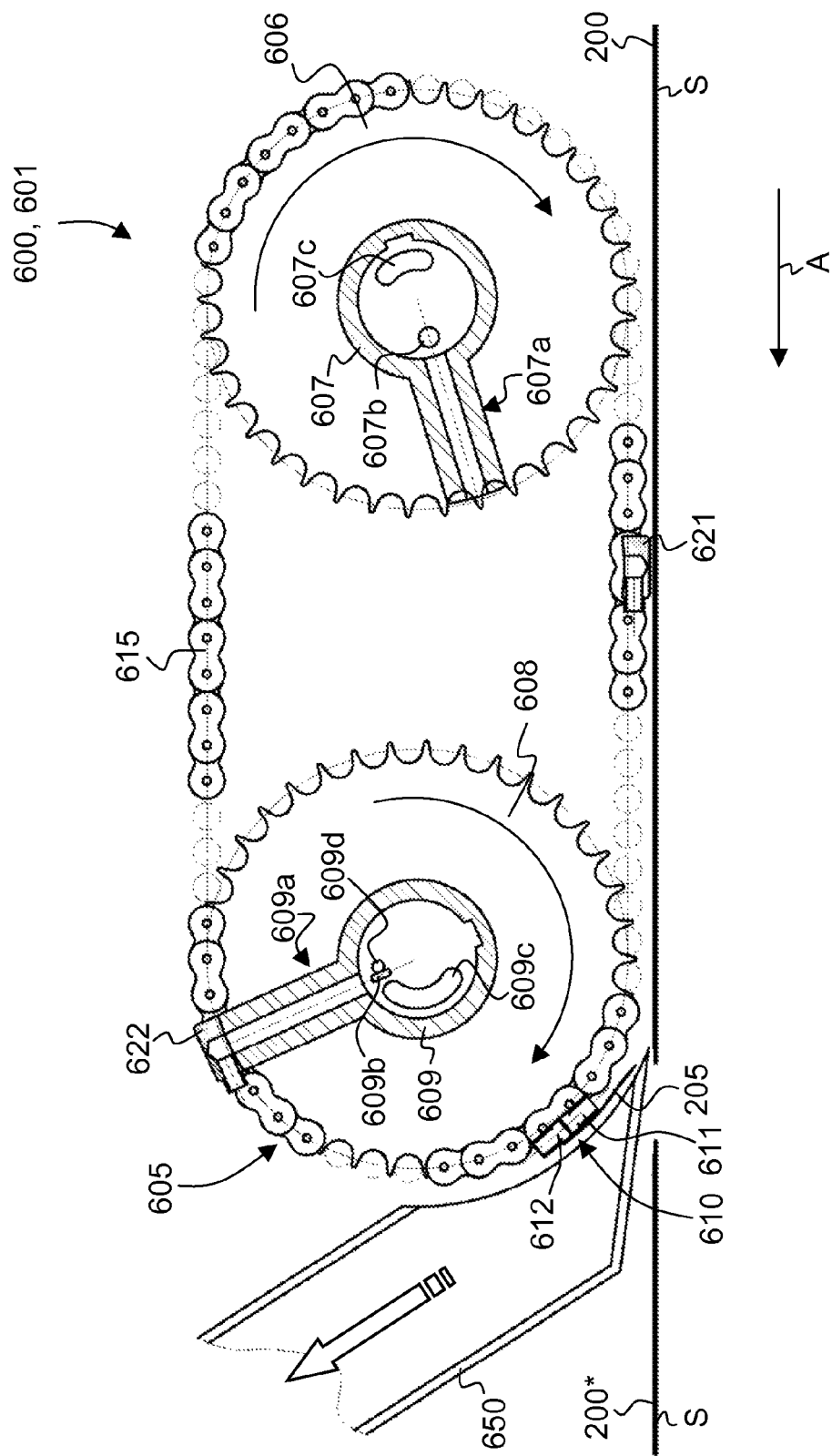

Once the holding member 610 holding the waste portion 205 of foil material 200 has reached the evacuation outlet 650, aspiration through the second suction portion 612 is stopped (the communication between ports 609b and 609c being interrupted as illustrated in FIG. 15), and air is preferably briefly blown through the suction portion 612 thanks to the cooperation between ports 609b and 609d to assist evacuation of the waste portion 205 via the evacuation outlet 650, as illustrated in FIG. 16.

While only one holding member 610 per sub-unit 601 has been described, it shall however be appreciated that two or more holding members 610 could be provided on each sub-unit 601. It shall furthermore be appreciated that the dimensions of the conveyor system 605 (especially the dimensions of the rotating bodies 606, 608 and the length of the chains 615) shall preferably be selected to ensure proper synchronism between the passage of the sheets S and of the corresponding holding member(s) 610, so that each holding member 610 is brought into contact with the desired portions of the continuous band of foil material 200 that is to be evacuated following the cutting process. Alternatively, the position and synchronism of the holding member 610 with respect to the sheets S and continuous bands of foil material 200 might be adjusted on the fly through a suitable control of a separate drive driving the conveyor system 605.

In the context of the particular embodiment discussed in reference to FIGS. 5 to 18, even though only one holding member 610 is illustrated, two holding members 610 are actually mounted on one and a same set of chains 615, which two holding members 610 are mounted at opposite locations of the chains 615, each holding member 610 being coupled to its own set of connecting parts 621, 622 mounted on the chains 615 and cooperating with the same rotary air connectors 607, 609 provided on the rotating bodies 606, 608 and connecting parts 621, 622 mounted on the chains 615. In such case, the length of the chains (i.e. the distance travelled by each holding member 610) corresponds to twice the distance between two successive cutting lines C1 (or C2), while each rotating body 606, 608 performs one complete revolution per sheet.

Various modifications and/or improvements may be made to the above-described embodiments without departing from the scope of the invention as defined by the annexed claims.

In particular, the waste portion 205 of foil material could be seized and held by other equivalent means than by suction, for instance mechanically by means of suitable gripper elements, by means of an adhesive head, by electrostatic attraction, or even by magnetic attraction provided the foil material contains magnetically-attractable compounds. Within the scope of the present invention as claimed, any suitable means could be used as long as these are adapted to seize the waste portions of foil material prior to cutting and hold these waste portions throughout the cutting process according to the principle of the present invention.

It shall furthermore be appreciated that, while the invention is preferably applied with a view to cover windows cut into the sheets, the invention is equally applicable to any other situation where one wishes to apply foil material onto the sheets by lamination, rather than by hot-foil stamping techniques. In particular, the invention could also be applied in the context of the reinforcement of regions of reduced thickness, such as discussed in WO 2004/024464 A1 for example.

In addition, a device (not illustrated) might be provided for checking that the waste portions 205 of foil material 200 have properly been evacuated. This could be performed using a simple light-emitting device directed towards the surface of the sheets S at the location where the foil material 200 is applied and a photoreceptor for checking a reflection point of the light beam produced by the light-emitting device. The device could alternatively comprise a camera for taking a whole picture of a portion of the location of the sheets S where the foil material 200 is applied and an image processing system for detecting presence or absence of the foil material 200.

Another refinement may be to provide means for checking passage of a leading and/or trailing edge of the sheets S and adjusting operation of the laser cutting unit 5*, 500 and of the waste handling unit 600 as a function of the passage of the said edge. Such means may include a device for generating a light beam perpendicularly to the plane where the sheets S are transported and detection means for monitoring a reflection point of the light beam generated by the said device on the surface of the sheets S. Alternatively, a photoreceptor might be provided on the other side of the sheets in order to detect interruption of the light beam caused by passage of the sheets S. Detection of the passage of the leading and/or trailing edge of the sheets S can be used to correct the timing of the laser cutting unit as well as driving of the conveyor system 605 of the waste handling unit 600 and ensure that the laser beams are generated at the appropriate times and that each holding member 610 is brought in contact with the relevant part of the foil material to be evacuated. Detection of the passage of both the trailing edge of a preceding sheet and the leading edge of a subsequent sheet may provide an indication of the actual distance between two successive sheets S.

Lastly, it might be advantageous to provide an inspection system downstream of the cutting unit for inspecting the quality of the sheets and detecting defects on the sheets, such as improperly cut foil material and/or waste portions of foil material sticking to the sheets, as the case may be.

What is claimed is:

1. An installation for applying foil material onto individual sheets, comprising:
   a sheet-by-sheet feeding station for feeding the individual sheets;
   a foil application unit for applying the at least one continuous band of foil material onto the individual sheets;
   a laser cutting unit, located downstream of the foil application unit, for cutting the at least one continuous band of foil material by means of a laser beam; and
   a sheet delivery station for receiving the individual sheets, the installation further comprising a waste handling unit for seizing and holding waste portions of the at least one continuous band of foil material, which waste handling unit comprises at least one holding member which is displaced adjacent to the surface of the individual sheets along a direction parallel to a direction of displacement of the individual sheets in synchronism with the passage of the individual sheets and of the at least one continuous band of foil material in order to seize the waste portions prior to cutting by the laser beam and hold the waste portions throughout the cutting process wherein said holding member removes said waste portion from the sheet downstream of the laser cutting unit.

2. The installation according to claim 1, wherein the holding member includes at least one suction head for seizing and holding the waste portions by aspiration.

3. The installation according to claim 1, wherein the waste handling unit comprises a conveyor system for displacing the holding member.

4. The installation according to claim 3, wherein the conveyor system includes at least first and second rotating bodies driving at least one chain or belt carrying the holding member, which chain or belt is driven in synchronism with the displacement of the individual sheets.

5. The installation according to claim 4, wherein the holding member includes at least one suction head for seizing and holding the waste portions by aspiration, the suction head comprising first and second suction portions for cooperation with the waste portions, the first suction portion being adapted to be coupled to a first rotary air connector provided on the first rotating body and the second suction portion being adapted to be coupled to a second rotary air connector provided on the second rotating body.

6. The installation according to claim 5, wherein the first suction portion is intermittently coupled to the first rotary air connector by means of a first connecting part carried by the chain or belt, which first connecting part is periodically coupled to an air duct of the first rotary air connector,
   and wherein the second suction portion is intermittently coupled to the second rotary air connector by means of a second connecting part carried by the chain or belt, which second connecting part is periodically coupled to an air duct of the second rotary air connector.

7. The installation according to any claim 1, wherein the waste handling unit further comprises at least one evacuation outlet where the waste portions are released from the holding member and evacuated.

8. The installation according to claim 1, wherein the holding member extends transversely to the direction of displacement of the individual sheets and is adapted to seize and hold the waste portions of at least two adjacent bands of foil material.

* * * * *